United States Patent
Lin et al.

(10) Patent No.: US 8,533,224 B2
(45) Date of Patent: *Sep. 10, 2013

(54) ASSESSING ACCURACY OF TRAINED PREDICTIVE MODELS

(75) Inventors: Wei-Hao Lin, New York, NY (US);
Travis Green, New York, NY (US);
Robert Kaplow, New York, NY (US);
Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/101,048

(22) Filed: May 4, 2011

(65) Prior Publication Data

US 2012/0284213 A1 Nov. 8, 2012

(51) Int. Cl.
*G06F 17/30* (2006.01)
(52) U.S. Cl.
USPC ........... 707/777; 707/771; 707/772; 707/773; 707/774; 707/778
(58) Field of Classification Search
CPC .................................. G06F 17/30; G06F 17/00
See application file for complete search history.

(56) References Cited

U.S. PATENT DOCUMENTS

| | | | |
|---|---|---|---|
| 5,271,088 A | | 12/1993 | Bahler |
| 5,583,968 A | * | 12/1996 | Trompf .......................... 704/232 |
| 5,586,221 A | * | 12/1996 | Isik et al. .......................... 706/23 |
| 5,727,128 A | * | 3/1998 | Morrison ......................... 706/45 |
| 5,752,007 A | * | 5/1998 | Morrison ........................... 703/2 |
| 5,862,513 A | * | 1/1999 | Mezzatesta et al. ............... 702/9 |
| 5,963,653 A | * | 10/1999 | McNary et al. ................ 382/103 |
| 6,003,003 A | * | 12/1999 | Asghar et al. ................... 704/243 |
| 6,038,528 A | * | 3/2000 | Mammone et al. ........... 704/203 |
| 6,042,548 A | * | 3/2000 | Giuffre .......................... 600/483 |
| 6,092,919 A | * | 7/2000 | Calise et al. ..................... 700/45 |
| 6,112,126 A | | 8/2000 | Hales et al. |
| 6,202,049 B1 | * | 3/2001 | Kibre et al. .................... 704/267 |
| 6,243,696 B1 | | 6/2001 | Keeler et al. |
| 6,498,993 B1 | | 12/2002 | Chen et al. |
| 6,519,534 B2 | | 2/2003 | Chen et al. |

(Continued)

OTHER PUBLICATIONS

Duchi, John, et al., "Boosting with Structural Sparsity", 2009, cs.berkeley.edu [online]. [Retrieved on Nov. 25, 2011]. Retrieved from the Internet: <URL: http://www.cs.berkeley.edu/~jduchi/projects/DuchiSi09d.pdf>, 41 pages.

(Continued)

*Primary Examiner* — Farhan Syed
(74) *Attorney, Agent, or Firm* — Fish & Richardson P.C.

(57) ABSTRACT

A system includes a computer(s) coupled to a data storage device(s) that stores a training data repository and a predictive model repository. The training data repository includes retained data samples from initial training data and from previously received data sets. The predictive model repository includes at least one updateable trained predictive model that was trained with the initial training data and retrained with the previously received data sets. A new data set is received. A richness score is assigned to each of the data samples in the set and to the retained data samples that indicates how information rich a data sample is for determining accuracy of the trained predictive model. A set of test data is selected based on ranking by richness score the retained data samples and the new data set. The trained predictive model is accuracy tested using the test data and an accuracy score determined.

18 Claims, 9 Drawing Sheets

(56) References Cited

U.S. PATENT DOCUMENTS

| | | | |
|---|---|---|---|
| 6,687,696 B2 | 2/2004 | Hofmann et al. | |
| 6,778,959 B1 | 8/2004 | Wu et al. | |
| 6,845,357 B2 | 1/2005 | Shetty et al. | |
| 6,879,971 B1 | 4/2005 | Keeler et al. | |
| 6,917,952 B1* | 7/2005 | Dailey et al. | 1/1 |
| 6,920,458 B1 | 7/2005 | Chu et al. | |
| 6,941,301 B2* | 9/2005 | Ferguson et al. | 1/1 |
| 6,944,616 B2* | 9/2005 | Ferguson et al. | 1/1 |
| 7,003,403 B1 | 2/2006 | Dougherty et al. | |
| 7,010,696 B1 | 3/2006 | Cambridge et al. | |
| 7,020,642 B2* | 3/2006 | Ferguson et al. | 706/21 |
| 7,039,475 B2* | 5/2006 | Sayyarrodsari et al. | 700/31 |
| 7,054,847 B2* | 5/2006 | Hartman et al. | 706/12 |
| 7,124,054 B2* | 10/2006 | Kim et al. | 702/181 |
| 7,162,741 B2* | 1/2007 | Eskin et al. | 726/25 |
| 7,184,845 B2* | 2/2007 | Sayyarrodsari et al. | 700/31 |
| 7,194,395 B2 | 3/2007 | Genovese | |
| 7,349,919 B2 | 3/2008 | Russell et al. | |
| 7,461,048 B2 | 12/2008 | Teverovskiy et al. | |
| 7,467,119 B2 | 12/2008 | Saidi et al. | |
| 7,561,158 B2 | 7/2009 | Abe et al. | |
| 7,565,304 B2 | 7/2009 | Casati et al. | |
| 7,580,848 B2 | 8/2009 | Eder | |
| 7,590,589 B2 | 9/2009 | Hoffberg | |
| 7,599,749 B2* | 10/2009 | Sayyarrodsari et al. | 700/28 |
| 7,599,897 B2* | 10/2009 | Hartman et al. | 706/15 |
| 7,606,924 B2 | 10/2009 | Raz et al. | |
| 7,643,989 B2 | 1/2010 | Deng et al. | |
| 7,650,331 B1 | 1/2010 | Dean et al. | |
| 7,668,740 B1 | 2/2010 | Baggett et al. | |
| 7,689,520 B2 | 3/2010 | Burges et al. | |
| 7,788,195 B1 | 8/2010 | Subramanian et al. | |
| 7,813,870 B2 | 10/2010 | Downs et al. | |
| 7,813,944 B1 | 10/2010 | Luk et al. | |
| 7,818,318 B2 | 10/2010 | Berger et al. | |
| 7,899,611 B2 | 3/2011 | Downs et al. | |
| 7,912,628 B2 | 3/2011 | Chapman et al. | |
| 7,912,773 B1 | 3/2011 | Subramanian et al. | |
| 7,930,266 B2 | 4/2011 | Tuv et al. | |
| 7,933,762 B2 | 4/2011 | Pinto et al. | |
| 7,959,565 B2 | 6/2011 | Hamilton et al. | |
| 7,963,916 B2 | 6/2011 | Hamilton et al. | |
| 7,970,721 B2 | 6/2011 | Leskovec et al. | |
| 7,979,365 B2 | 7/2011 | Goldberg et al. | |
| 8,027,854 B2 | 9/2011 | Baggett et al. | |
| 8,065,073 B2 | 11/2011 | Downs et al. | |
| 8,065,659 B1 | 11/2011 | Prince et al. | |
| 8,090,524 B2 | 1/2012 | Chapman et al. | |
| 8,112,417 B2 | 2/2012 | Berger et al. | |
| 8,185,486 B2 | 5/2012 | Eder | |
| 8,229,864 B1 | 7/2012 | Lin et al. | |
| 8,244,654 B1 | 8/2012 | Hobgood et al. | |
| 8,301,498 B1 | 10/2012 | Cortes et al. | |
| 2002/0099730 A1 | 7/2002 | Brown et al. | |
| 2003/0088412 A1 | 5/2003 | Shetty et al. | |
| 2003/0145000 A1 | 7/2003 | Arning et al. | |
| 2003/0176931 A1 | 9/2003 | Pednault | |
| 2003/0212851 A1 | 11/2003 | Drescher et al. | |
| 2004/0009536 A1 | 1/2004 | Grass et al. | |
| 2004/0117040 A1* | 6/2004 | Sayyarrodsari et al. | 700/29 |
| 2004/0130276 A1* | 7/2004 | Sayyarrodsari et al. | 315/501 |
| 2005/0125474 A1 | 6/2005 | Pednault | |
| 2005/0234753 A1 | 10/2005 | Pinto et al. | |
| 2006/0173906 A1 | 8/2006 | Chu et al. | |
| 2007/0005311 A1 | 1/2007 | Wegerich et al. | |
| 2007/0150424 A1 | 6/2007 | Igelnik | |
| 2007/0198104 A1* | 8/2007 | Sayyarrodsari et al. | 700/44 |
| 2008/0097937 A1* | 4/2008 | Hadjarian | 706/12 |
| 2008/0154821 A1 | 6/2008 | Poulin | |
| 2008/0270363 A1* | 10/2008 | Hunt et al. | 707/3 |
| 2008/0288209 A1* | 11/2008 | Hunt et al. | 702/179 |
| 2008/0288889 A1* | 11/2008 | Hunt et al. | 715/810 |
| 2008/0294372 A1* | 11/2008 | Hunt et al. | 702/179 |
| 2008/0294996 A1* | 11/2008 | Hunt et al. | 715/739 |
| 2008/0319829 A1* | 12/2008 | Hunt et al. | 705/10 |
| 2009/0006156 A1* | 1/2009 | Hunt et al. | 705/7 |
| 2009/0018996 A1* | 1/2009 | Hunt et al. | 707/2 |
| 2009/0024546 A1 | 1/2009 | Ficcaglia et al. | |
| 2009/0030864 A1* | 1/2009 | Pednault et al. | 706/45 |
| 2009/0106178 A1 | 4/2009 | Chu | |
| 2009/0132448 A1 | 5/2009 | Eder | |
| 2009/0157571 A1 | 6/2009 | Smith et al. | |
| 2009/0177450 A1 | 7/2009 | Gray et al. | |
| 2010/0049538 A1* | 2/2010 | Frazer et al. | 705/1 |
| 2010/0100826 A1 | 4/2010 | Hawthorne et al. | |
| 2010/0293175 A1 | 11/2010 | Vadrevu et al. | |
| 2011/0145175 A1 | 6/2011 | Agarwal | |
| 2011/0202487 A1 | 8/2011 | Koshinaka | |
| 2011/0251945 A1 | 10/2011 | Liao et al. | |
| 2011/0289025 A1 | 11/2011 | Yan et al. | |
| 2011/0313900 A1 | 12/2011 | Falkenborg et al. | |

OTHER PUBLICATIONS

Duchi, John, et al., "Boosting with Structural Sparsity", Proceedings of the 26th International Conference on Machine Learning, Montreal, Canada, 2009, cs.berkeley.edu [online]. [Retrieved on Nov. 25, 2011]. Retrieved from the Internet: <URL: http://www.cs.berkeley.edu/~jduchi/projects/DuchiSi09a.pdf>, 8 pages.

"Google Prediction API (Labs)", Google.com, [Retrieved on May 4, 2011]. Retrieved from the Internet: <URL: http://code.google.com/apis/predict/>, 21 pages.

R-Project web pages, 190 pages [online] [retrieved on May 18, 2010]. Retrieved from the Internet: <URL: http://www.r-project.org/>. 190 pages.

Uclassify web pages, 16 pages [online] [retrieved on May 18, 2010]. Retrieved from the Internet: <URL: http://www.uclassify.com/>.

Zementis web pages, 34 pages [online] [retrieved on May 18, 2010]. Retrieved from the Internet: <URL: http://www.zementis.com/>.

Chandra, Tushar, "Sibyl: A system for large scale machine learning" Keynote I PowerPoint presentation, Jul. 28, 2010, ladisworkshop.org [online] [Retrieved on Jan. 25, 2011]. Retrieved from the Internet: <URL: http://ladisworkshop.org/sites/default/files/LADIS%202010%20actual.pdf>, 43 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/.../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc . . . >, 2 pages.

Google Apps Script Overview [online] [retrieved on May 6, 2011], Retrieved from the Internet: <URL: code.google.com/.../guide.html>, 4 pages.

Creative Commons Attribution-Share Alike 3.0 Unported, Cross-validation (statistics)., May 28, 2011, retrieved from: http://en.wikipedia.org/w/index.php?title=Cross-validation_(statistics) &oldid=431307466; pp. 1-5.

Creative Commons Attribution-Share Alike 3.0 Unported, Winnow (algorithm)., May 29, 2011, retrieved from http://en.wikipedia.org/w/index.php?title=Winnow_(algorithm)&oldid=431561845, 2 pages.

Bengio, Yoshua, Continuous Optimization of Hyper-Parameters, C.P. 6128 Succ. Centre-Ville, Montreal, Quebec, Canada, H3C 3J7, Aug. 6, 2002, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, Nov. 24, 2003, 12 pages.

C.E. Rasmussen & C.K.I. Williams, Gaussian Processes for Machine Learning, Model Selection and Adaptation of Hyperparameters, Chapter 5, The MIT Press, 2006 Massachusetts Institute of Technology. [Retrieved from the Internet on Aug. 10, 2011]. Retrieved from the Internet: <URL: http://www.gaussianprocess.org/gpml/chapters/RW5.pdf, 24 pages.

R. Duin, "The Combining Classifer: To Train or Not to Train?", IEEE Pattern Recognition, 2002 Proceedings, 16 International Conference, pp. 765-770.

L. Denoyer et al., "Structured Multimedia Document Classification", ACM DocEng '03, Nov. 20-22, 2003, pp. 153-160.

J. Platt et a., "Large Margin DAGs for Multiclass Classification", In Advances in Neural Information Processing Systems, S.A. Solla et al., eds., MIT Press 2000, pp. 1-7.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, Volum 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

Delany, et al., Generating Estimates of Classification Confidence for a Case-Based Spam Filter'; 2005; Springer-Vergal Berlin Heidelberg; Lecture Notes in Computer Science, 2005, vol. 3620, pp. 177-190.

Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000;Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Predictive Dynamix Inc., Predictive Modeling Technology, Predictive Dynamix, Inc., 2003-2004, 5 pages.

Duin, P.W. Robert, et al., Experiments with Classifier Combining Rules, J. Kittler and F. Foli (Eds.): MCS 2000, LNCS 1857, pp. 16-29, 14 pages.

Barbieri, Maddalena Maria, et al., Optimal Predictive Model Selection, The Annals of Statistics, 2004, vol. 32, No. 3, 29 pages.

Yuan, Zheng et al., Combining Linear Progression Models: When and How? Dec. 2004, 27 pages.

Evaluating Predictive Models, 36-350, Data Mining, Principles of Data Mining, Chapter 7; Berk chapter 2, Oct. 26 and 28, 2001, 22 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, The free encyclopedia, [online] [retrieved on Sep. 8, 2011]. Retrieved from the Internet: http://en.wikipedia.org/wiki/Active learning (machine learning), 3 pages.

S.B. Kotsiantis: "An incremental ensemble of classifiers", Artificial Intelligence Review, vol. 36, No. 4, Mar. 11, 2011, pp. 249-266.

S.B. Kotsiantis, et al.: Machine learning: A review of classification and combining techniques:, Artificial Intelligence Review, vol. 26, No. 3., Nov. 10, 2007, pp. 159-190.

Google: "Google prediction API: Prediction v1.2 reference", Google Developers, 2012, retrieved from the Internet: URL: https://developers.google.com/prediction/docs/reference/v1.2/reference [retrieved on Jul. 27, 2012].

T. Green, et al.: "Prediction API: Every app a smart app", Google Developers Blog, Apr. 21, 2011, Retrieved from the Internet: URL:http//googledevelopers.blogspot.n1/2p/11/04/prediction-api-every-app-smart-app.html [retrieved on Jul. 27, 2012].

S. Reed, et al.: "Cross-validation support? and replies", Google Group prediction-api-discuss, Jun. 14, 2010, Retrieved from the Internet: URL:https://groups.google.com/group/prediction-api-discuss/ [retrieved on May 22, 2010].

Google: "Google prediction API", Google Code, 2012, retrieved from the Internet: URL: http://code.google.com/apis/predict/ [retrieved on May 22, 2010].

C.D. Manning, et al.: "8.3 Evaluation of unranked retrieval sets", Introduction to Information Retrieval (online edition), Apr. 7, 2009, retrieved from the Internet: URL:http://nlp.stanford.edu/IR-book/html/htmledition/evaluation-of-unranked-retrieval-sets-l.html [retrieved on Jul. 27, 2012].

International Search Report and Written Opinion for PCT Application Serial Number PCT/US2012/035978, search report completed Jul. 31, 2012, mailed Aug. 8, 2012, 93 pages.

* cited by examiner

ASSESSING ACCURACY OF TRAINED PREDICTIVE MODELS

TECHNICAL FIELD

This specification relates to assessing accuracy of trained predictive models.

BACKGROUND

Predictive analytics generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection. Multiple predicative models can be trained using a same set of training data, yet each trained model can generate outputs with varying degrees of accuracy.

SUMMARY

In general, in one aspect, the subject matter described in this specification can be embodied in a computer-implemented system that includes one or more computers and one or more data storage devices coupled to the one or more computers, storing a training data repository, a predictive model repository and instructions. The training data repository includes retained data samples that include at least some data samples from an initial training data set and from multiple previously received update data sets. Each data sample includes input data and corresponding output data. The predictive model repository includes at least one updateable trained predictive model that was trained with the initial training data set and retrained with the previously received update data sets. The instructions, when executed by the one or more computers, cause the one or more computers to perform operations that include receiving a new data set of data samples (each data sample including input data and corresponding output data). The data set is new compared to the initial training data set and to the previously received update data sets. A richness score is assigned to each of the data samples included in the new data set and to the retained data samples included in the training data repository. The richness score for a particular data sample indicates how information rich the particular data sample is relative to other retained data samples for determining an accuracy of the trained predictive model. The data samples included in the new data set and the retained data samples are ranked based on the assigned richness scores. A set of test data is selected from the data samples included in the new data set and the retained data samples based on the ranking. The trained predictive model is tested for accuracy in determining predictive output data for given input data using the set of test data and an accuracy score is determined for the trained predictive model based on the testing. Other embodiments of this aspect include corresponding methods and computer programs recorded on computer storage devices, each configured to perform the operations described above.

These and other embodiments can each optionally include one or more of the following features, alone or in combination. The trained predictive model can be included in a repository of trained predictive models that were all trained using the same initial training data set and at least some of which are updateable and were retrained using the received update data sets. Each of the trained predictive models in the repository can be tested for accuracy using the set of test data and accuracy scores determined based on the testing for each of the trained predictive models. A first trained predictive model can be selected from the repository of trained predictive models based on the accuracy scores. Access can be provided to the first trained predictive model to a client computing system for generating predictive output data based on input data received from the client computing system.

After determining accuracy scores for each of the trained predictive models, each of the updateable trained predictive models included in the repository can be retrained using the new data set. The repository can be updated to replace the updateable trained predictive models with the retrained predictive models. Each retrained predictive model can be associated with the accuracy score determined for the trained predictive model from which the retrained predictive model was derived. Assigning a richness score to the particular data sample can include determining the richness score based on how many data samples have similar input data but different output data than the particular data sample and based on how many data samples have similar input data and similar or different output data than the particular data sample. Selecting a set of test data from the data samples can include selecting the top $n^{th}$ ranked data samples where n is an integer greater than one.

Testing how accurate the trained predictive model is in determining predictive output data for given input data using the set of test data can include generating predictive output data for the input data included in the data samples of the test data set. Determining an accuracy score based on the testing can include comparing the predictive output data to the output data included the data samples that correspond to the input data used to generate the predictive output data and determining the accuracy score based on the comparison. After determining the accuracy score for the trained predictive model, the trained predictive model can be retrained using the new data set of data samples.

In general, in another aspect, the subject matter described in this specification can be embodied in a computer-implemented system that includes one or more computers and one or more data storage devices coupled to the one or more computers that store a repository of training functions, a predictive model repository of trained predictive models and instructions. The predictive model repository includes multiple updateable trained predictive models which are each associated with an accuracy score that represents an estimation of the accuracy of the trained predictive model. The instructions, when executed by the one or more computers, cause the one or more computers to perform operations that include receiving over a network a series of training data sets for predictive modeling from a client computing system. The training data included in the training data sets includes training samples that each include output data that corresponds to input data. The training data included in the training data sets is different from initial training data that was used with multiple training functions obtained from the repository to train the trained predictive models stored in the predictive model repository initially. Upon receiving a first training data set included in the series of training data sets and for each trained predictive model in the predictive model repository, the input data included in the first training data set is used to generate predictive output data. The predictive output data is compared to the output data included in the first training data set. Based on the comparison and previous comparisons that were determined from the initial training data and from previously received training data sets, an updated accuracy score for association with each trained predictive model in the repository is determined. For each updateable trained predictive model in the predictive model repository, the first training data set, a first training function obtained from the repository of training functions that was used to generate the updateable trained predictive model and the updateable trained predictive model itself are used to generate a retrained predictive model. The updateable trained predictive model is then replaced in the predictive model repository with the retrained predictive model. A first trained predictive model is selected from among the plurality of trained predictive models and retrained predictive models included in the predictive model repository based on the determined updated accuracy scores. Access is provided to the first trained predictive model over the network. Other embodiments of this aspect include corresponding methods and computer programs recorded on computer storage devices, each configured to perform the operations described above.

These and other embodiments can each optionally include one or more of the following features, alone or in combination. Determining the updated accuracy score for a particular trained predictive model can include: summing a number of correct predictive outputs included in the generated predictive output data as determined from the comparison; adding the sum of correct predictive outputs to previously determined sums of correct predictive outputs that were determined when the initial training data and other training data sets in the series of training data sets were received to determine a total number of correct predictive outputs; and dividing the total number of correct predictive outputs by a sum of the number of training samples included in the first training data set added to the number of training samples included in the initial training data and the other training data sets.

In other implementations, determining the updated accuracy score for a particular trained predictive model includes: summing a number of correct predictive outputs included in the generated predictive output data as determined from the comparison; weighting the sum of corrective predictive outputs with a first weight that is determined based on time of receipt of the first training data set; adding the weighted sum of correct predictive outputs to previously determined weighted sums of correct predictive outputs that were determined when the initial training data and other training data sets in the series of training data sets were received to determine a total number of correct predictive outputs, wherein each weighted sum is weighted based on a time of receipt of corresponding training data; and dividing the total number of correct predictive outputs by the number of training samples included in the first training data set weighted by the first weight summed with the numbers of training samples included in the initial training data and the other training data sets, where each of the numbers of training samples is weighted according to the same weight as its corresponding sum of predictive outputs.

In other implementations, determining the updated accuracy score for a particular trained predictive model includes: summing a number of correct predictive outputs included in the generated predictive output data as determined from the comparison; identifying which training data sets from the initial training data and from the series of training data sets were received within a predetermined time-based window; adding the sum of correct predictive outputs to previously determined sums of correct predictive outputs that were determined when the identified training data sets were each received to determine a total number of correct predictive outputs; and dividing the total number of correct predictive outputs by a sum of the number of training samples included in the first training data set added to the number of training samples included in the identified training data sets. In one example, the predetermined time-based window indicates a discrete period of time during which the training data sets must have been received to be included in the identified training data sets. In another example, the predetermined time-based window indicates a discrete number of most recently received training data sets that are to be included in the identified training data sets.

Particular embodiments of the subject matter described in this specification can be implemented so as to realize one or more of the following advantages. Accuracy scores can be determined that are reflective of more recently received data samples. As input data to be input into a trained predictive model to generate a predictive output changes over time, the accuracy of the trained predictive model may also change. Determining the accuracy score based on data samples that are representative of current input data can help to select the most accurate trained predictive model at a given time. Memory space can limit the volume of data samples that can be retained. Determining which data samples are the most information-rich can be useful in selecting a set of test data and/or training data to be used and/or retained in memory.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Methods and systems are described that provide accuracy assessments of trained predictive models. The trained predictive models can be included in a dynamic repository of trained predictive models, at least some of which can be updated as new training data becomes available. As new training data is received and used to update the trained predictive models, the accuracy of the models can change. As such, accuracy assessments are also updated to reflect the current state of the trained predictive models included in the dynamic repository. A trained predictive model from the dynamic repository can be provided and used to generate a predictive output for a given input. As a particular client entity's training data changes over time, the client entity can be provided access to a trained predictive model that has been trained with training data reflective of the changes. Selection of the trained predictive model to provide to the client entity can be based on the updated accuracy assessments of the trained predictive models included in the repository. As such, the repository of trained predictive models from which a predictive model can be selected to use to generate a predictive output is "dynamic", as compared to a repository of trained predictive models that are not updateable with new training data and are therefore "static".

Figure 1:
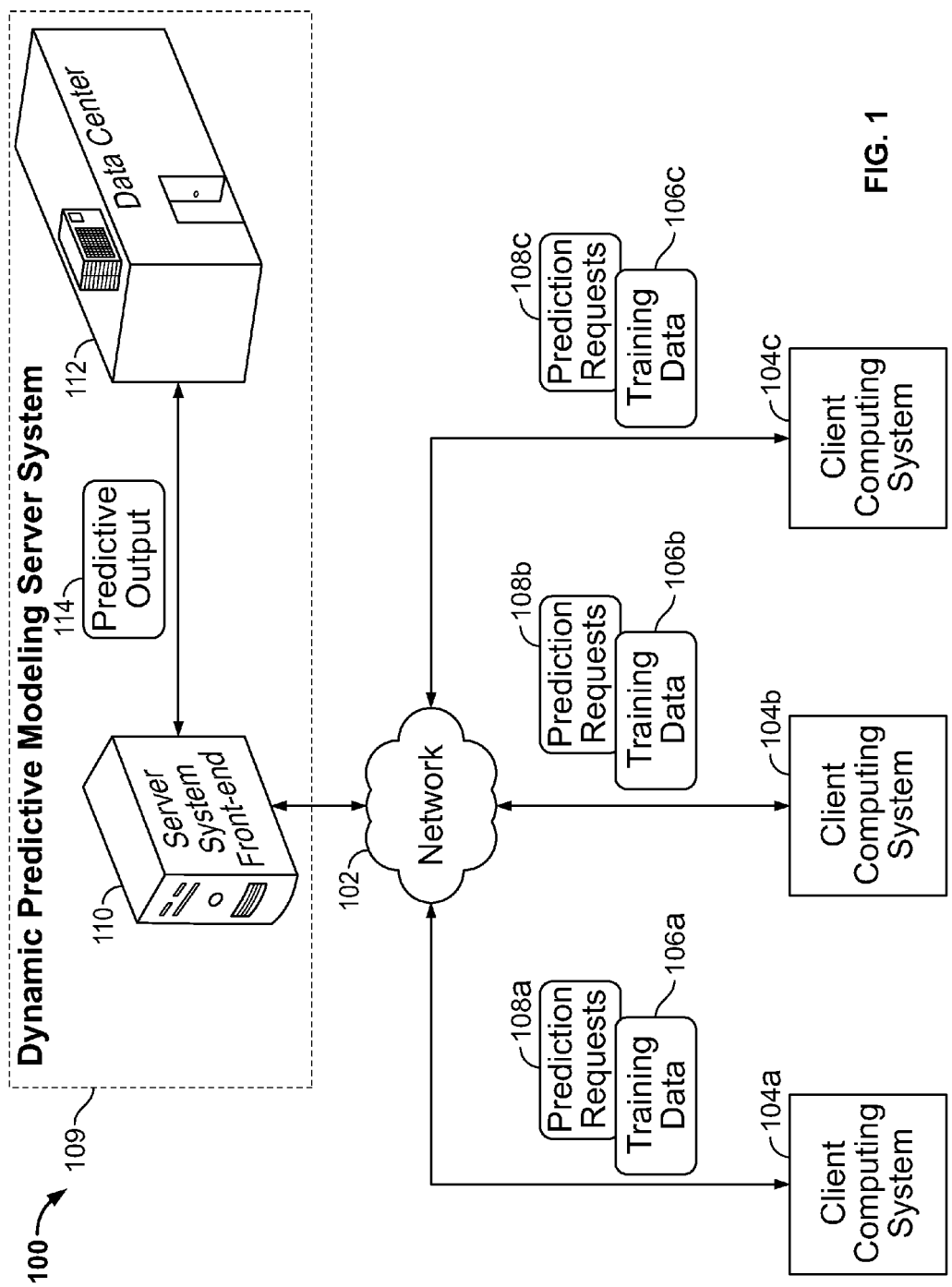
FIG. 1 is a schematic representation of a system that provides a predictive analytic platform.

FIG. 1 is a schematic representation of a system that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large numbers of computers, housed in one or more buildings, that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available, e.g., on an ad hoc basis, periodically in batches, in a batch once a certain volume has accumulated, streamed from a client computing system or otherwise.

The server system front end 110 can receive, store and manage large volumes of data using the data center 112. One or more computers in the data center 112 can run software that uses the training data to estimate the effectiveness (i.e., accuracy) of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing system 104a can transmit prediction requests 108a over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provide and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations, that can access the predictive modeling server system. The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
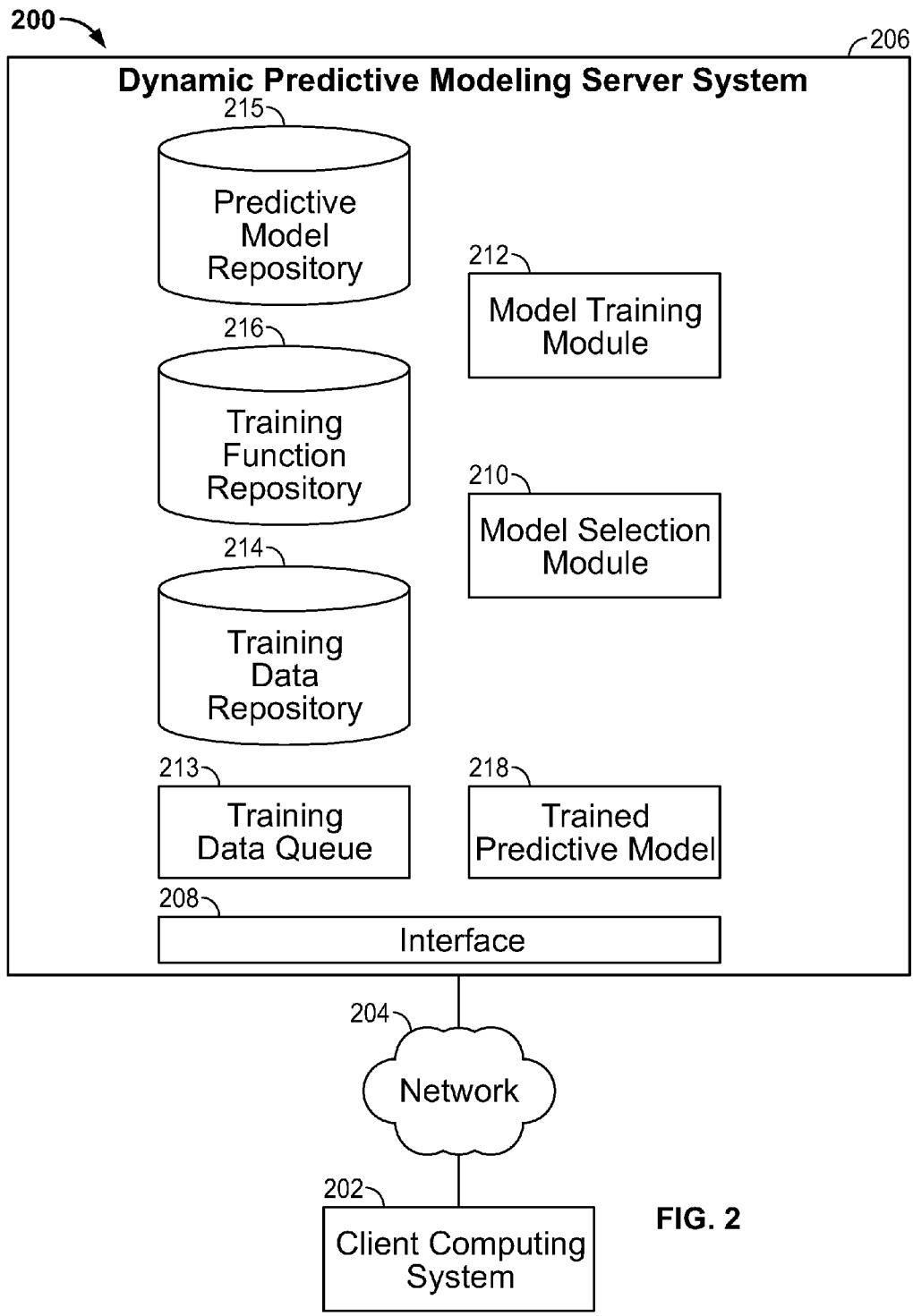
FIG. 2 is a schematic block diagram showing a system for providing a predictive analytic platform over a network.

FIG. 2 is a schematic block diagram showing a system 200 for providing a dynamic predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data queue 213, the training data repository 214, the model selection module 210 and/or the trained model repository 218.

Figure 3:
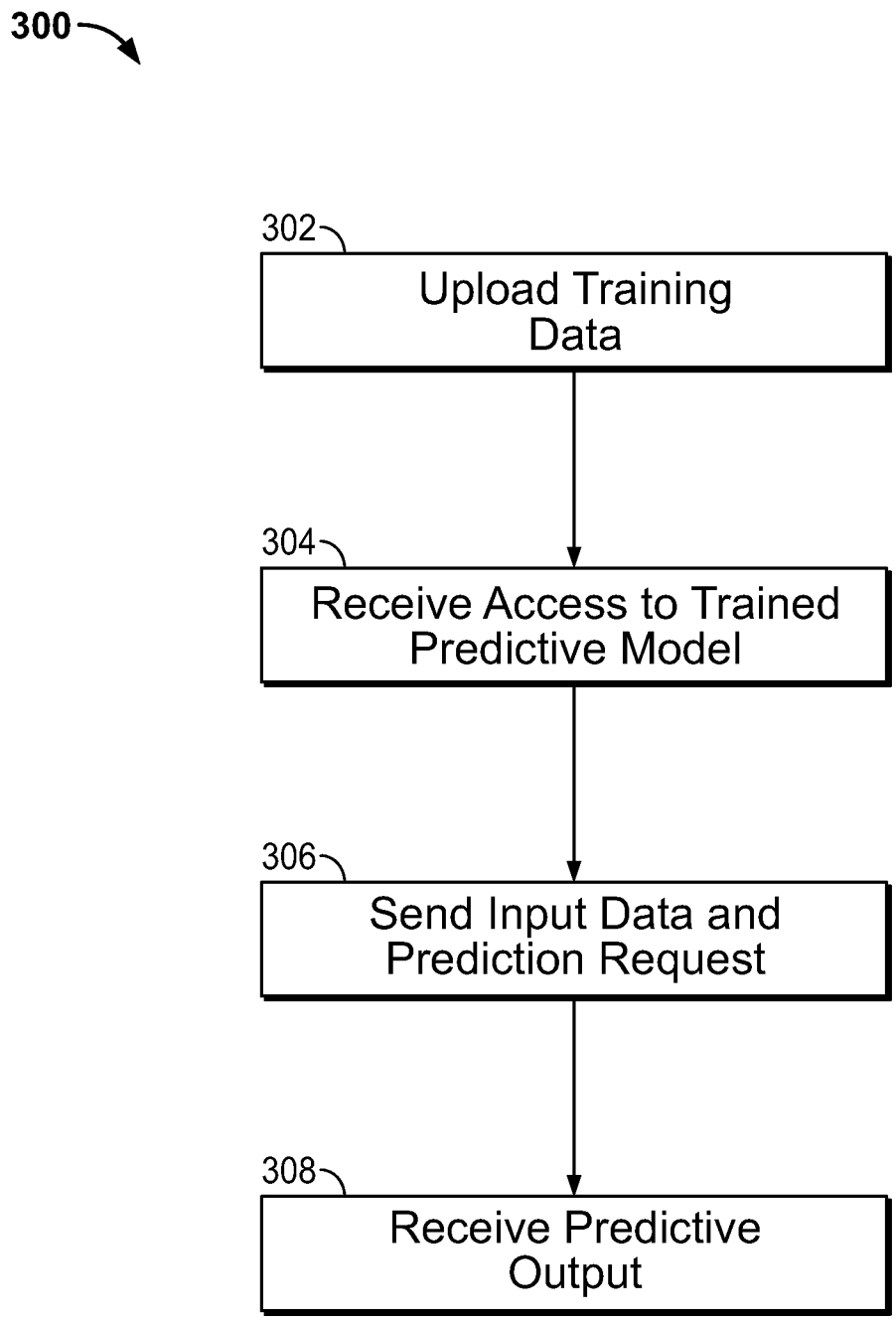
FIG. 3 is a flowchart showing an example process for using the predictive analytic platform from the perspective of the client computing system.

FIG. 3 is a flowchart showing an example process 300 for using the predictive analytic platform from the perspective of the client computing system 202. The process 300 would be carried out by the client computing system 202 when the corresponding client entity is uploading the initial training data to the system 206. The client computing system 202 uploads training data (i.e., the initial training data) to the predictive modeling server system 206 over the network 204 (Step 302). In some implementations, the initial training data is uploaded in bulk (e.g., a batch) by the client computing system 202. In other implementations, the initial training data is uploaded incrementally by the client computing system 202 until a threshold volume of data has been received that together forms the "initial training data". The size of the threshold volume can be set by the system 206, the client computing system 202 or otherwise determined. In response, the client computing system 202 receives access to a trained predictive model, for example, trained predictive model 218 (Step 304).

In the implementation shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model (Step 306). In response, the client computing system receives a predictive output generated by the trained predictive model from the input data (Step 308).

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client entity.

Figure 4:
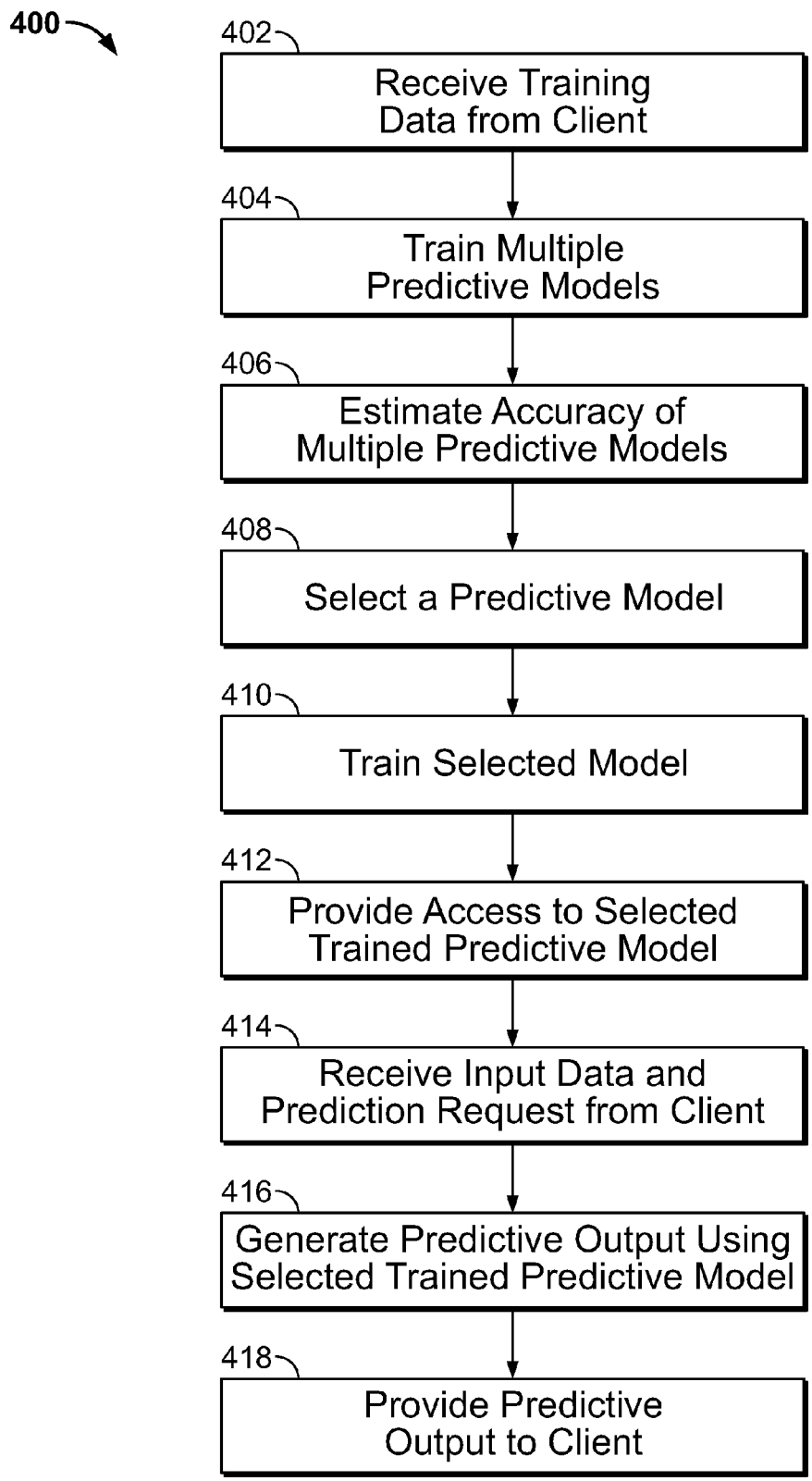
FIG. 4 is a flowchart showing an example process for serving a client computing system using the predictive analytic platform.

The predictive modeling server system 206 will now be described in more detail with reference to the flowchart shown in FIG. 4. FIG. 4 is a flowchart showing an example process 400 for serving a client computing system using the predictive analytic platform. The process 400 is carried out to provide access of a selected trained predictive model to the client computing system, which trained predictive model has been trained using initial training data. Providing accessing to the client computing system of a predictive model that has been retrained using new training data (i.e., training data available after receiving the initial training data) is described below in reference to FIGS. 5 and 6.

Referring to FIG. 4, training data (i.e., initial training data) is received from the client computing system (Step 402). For example, the client computing system 202 can upload the training data to the predictive modeling server system 206 over the network 204 either incrementally or in bulk (i.e., as batch). As described above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used. In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using an HTTP web service. The client computing system 202 can access storage objects using a RESTful API to upload and to store their training data on the predictive modeling server system 206. In other implementations, the training data is uploaded using a hosted execution platform, e.g., AppEngine available from Google Inc. of Mountain View, Calif. The predictive modeling server system 206 can provide utility software that can be used by the client computing system 202 to upload the data. In some implementations, the predictive modeling server system 206 can be made accessible from many platforms, including platforms affiliated with the predictive modeling server system 206, e.g., for a system affiliated with Google, the platform could be a Google App Engine or Apps Script (e.g., from Google Spreadsheet), and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The predictive modeling server system 206 includes a repository of training functions for various predictive models, which in the example shown are included in the training function repository 216. At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Rewritten Winnow, Support Vector Machine (SVM) Analogue, Maximum Entrophy (MaxEnt) Analogue, Gradient based (FOBOS) and AdaBoost with Mixed Norm Regularization. The training function repository 216 can include one or more of these example training functions.

Referring again to FIG. 4, multiple predictive models, which can be all or a subset of the available predictive models, are trained using some or all of the training data (Step 404). In the example predictive modeling server system 206, a model training module 212 is operable to train the multiple predictive models. The multiple predictive models include one or more updateable predictive models and can include one or more static predictive models.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyper-parameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict an output, different trained predictive models perform differently. That is, some can be more accurate than others in predicting outputs for given inputs.

The accuracy of each of the trained predictive models is estimated (Step 406). For example, a model selection module 210 is operable to estimate the accuracy of each trained predictive model to determine an initial accuracy score and subsequent new accuracy scores, as new data is received. In some implementations, cross-validation is used to estimate the accuracy of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K-1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the accuracy of each trained predictive model is initially estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the accuracy of the trained model. For example, cross-validation results can be used to indicate whether the trained predictive model generated more false positive results than true positives and ignores any false negatives. The accuracy of the multiple predictive models that is estimated at Step 406 is the initial accuracy. That is, the initial accuracy of a predictive model is the accuracy of the predictive model that has been trained using an initial set of training data.

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Referring again to FIG. 4, each trained model is assigned a score that represents the accuracy of the trained model. As discussed above, the criteria used to estimate accuracy can vary. In the example implementation described, the criterion is the accuracy of the trained model and is estimated using a cross-validation score. Based on the scores, a trained predictive model is selected (Step 408). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the accuracy of the trained model, then the model was not trained with all of the training data at one time, but rather only K-1 partitions of the training data. Accordingly, if necessary, the selected predictive model is fully trained using the training data (e.g., all K partitions) (Step 410), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

Of the multiple trained predictive models that was trained as described above, some or all of them can be stored in the predictive model repository 215. Each trained predictive model can be associated with its respective accuracy score. One or more of the trained predictive models in the repository 215 are updateable predictive models. In some implementations, the predictive models stored in the repository 215 are trained using the entire initial training data, i.e., all K partitions and not just K-1 partitions. In other implementations, the trained predictive models that were generated in the evaluation phase using K-1 partitions are stored in the repository 215, so as to avoid expending additional resources to recompute the trained predictive models using all K partitions.

Access to the trained predictive model is provided (Step 412) rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202. If the client computing system 202 desires to access the trained predictive model 218 to receive a predictive output, the client computing system 202 can transmit to the URL a request that includes the input data. The predictive modeling server system 206 receives the input data and prediction request from the client computing system 202 (Step 414). In response, the input data is input to the trained predictive model 218 and a predictive output generated by the trained model (Step 416). The predictive output is provided; it can be provided to the client computing system (Step 418).

In some implementations, where the client computing system is provided with a URL to access the trained predictive model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling system 206, e.g., the model training module 212, model selection module 210 and trained predictive model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

Figure 5:
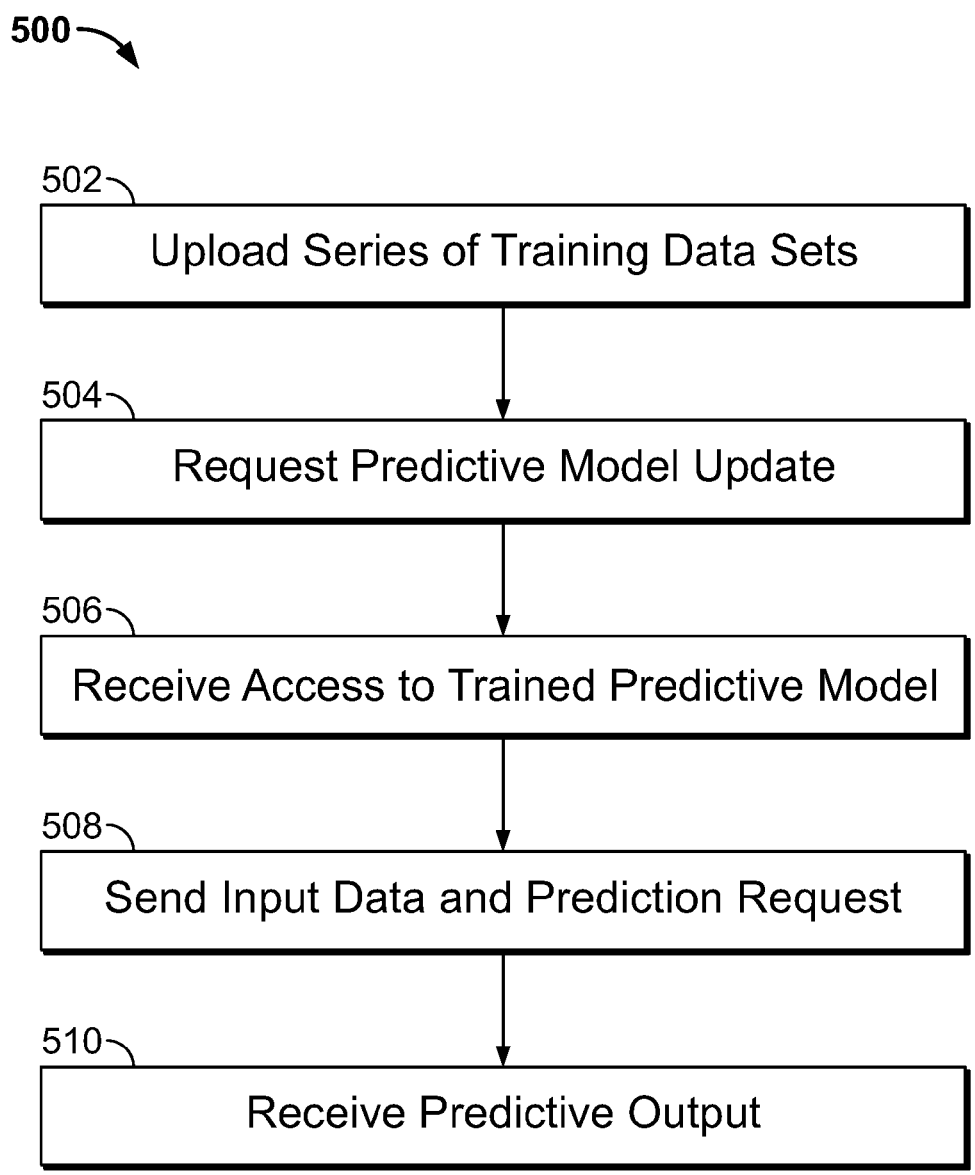
FIG. 5 is a flowchart showing an example process for using the predictive analytic platform from the perspective of the client computing system.

FIG. 5 is a flowchart showing an example process 500 for using the predictive analytic platform from the perspective of the client computing system. For illustrative purposes, the process 500 is described in reference to the predictive modeling server system 206 of FIG. 2, although it should be understood that a differently configured system could perform the process 500. The process 500 would be carried out by the client computing system 202 when the corresponding client entity was uploading the "new" training data to the system 206. That is, after the initial training data had been uploaded by the client computing system and used to train multiple predictive models, at least one of which was then made accessible to the client computing system, additional new training data becomes available. The client computing system 202 uploads the new training data to the predictive modeling server system 206 over the network 204 (Box 502).

In some implementations, the client computing system 202 uploads new training data sets serially. For example, the client computing system 202 may upload a new training data set whenever one becomes available, e.g., on an ad hoc basis and/or by streaming. In another example, the client computing system 202 may upload a new training data set according to a particular schedule, e.g., at the end of each day. In some implementations, the client computing system 202 uploads a series of new training data sets batched together into one relatively large batch. For example, the client computing system 202 may upload a new batch of training data sets whenever the batched series of training data sets reach a certain size (e.g., number of mega-bytes). In another example, the client computing system 202 may upload a new batch of training data sets accordingly to a particular schedule, e.g., once a month.

Table 1 below shows some illustrative examples of commands that can be used by the client computing system 202 to upload a new training data set that includes an individual update, a group update (e.g. multiple examples within an API call), an update from a file and an update from an original file (i.e., a file previously used to upload training data).

TABLE 1

| Type of Update | Command |
| --- | --- |
| Individual Update | curl -X POST -H ... -d "{\"data\":{\"input\":{\"csvInstance\": [0,2]}\"label\":[0]}}"https.../bucket%2Ffile.csv/update |
| Individual Update | curl -X POST -H ... -d "{\"data\":{\"data\": [0,0,2]}} https.../bucket%2Ffile.csv/update |
| Group Update | curl -X POST -H ...-d"{\"data\":{\"input\":{\"csvInstance\": [[0,2],[1,2] ... [x,y]]}\"label\":[0, 1 ...z]}}" https.../bucket%2Ffile.csv/update |
| Group Update | curl -X POST -H ...-d"{\"data\":{\"data\": [[0,0,.2],[1,1,2] ... [z,x,y]]}} https.../bucket%2Ffile.csv/update |
| Update from File | curl -X POST -H ... - d "bucket%2Fnewfile" https .../bucket%2Ffile.csv/update |
| Update from Original File | curl -X POST -H ... https.../bucket%2Ffile.csv/update |

In the above example command, "data" refers to data used in training the models (i.e., training data); "input" and "label" refers to data to be used to update the model (i.e., new training data), "bucket" refers to a location where the models to be updated are stored, "x", "y" and "z" refer to other potential data values for a given feature.

The series of training data sets uploaded by the client computing system 202 can be stored in the training data queue 213 shown in FIG. 2. In some implementations, the training data queue 213 accumulates new training data until an update of the updateable trained predictive models included in the predictive model repository 215 is performed. In other implementations, the training data queue 213 only retains a fixed amount of data or is otherwise limited. In such implementations, once the training data queue 213 is full, an update can be performed automatically, a request can be sent to the client computing system 202 requesting instructions to perform an update, or training data in the queue 213 can be deleted to make room for more new training data. Other events can trigger a retraining, as is discussed further below.

The client computing system 202 can request that the system's trained predictive models be updated (Box 504). For example, when the client computing system 202 uploads the series of training data sets (either incrementally or in batch or a combination of both), an update request can be included or implied, or the update request can be made independently of uploading new training data.

In some implementations, an update automatically occurs upon a condition being satisfied. For example, receiving new training data in and of itself can satisfy the condition and trigger the update. In another example, receiving an update request from the client computing system 202 can satisfy the condition. Other examples are described further in reference to FIG. 5.

As described above in reference to FIGS. 2 and 4, the predictive model repository 215 includes multiple trained predictive models that were trained using training data uploaded by the client computing system 202. At least some of the trained predictive models included in the repository 215 are updateable predictive models. When an update of the updateable predictive models occurs, retrained predictive models are generated using the data in the training data queue 213, the updateable predictive models and the corresponding training functions that were used to train the updateable predictive models. Each retrained predictive model represents an update to the predictive model that was used to generate the retrained predictive model.

Each trained predictive model in the repository 215 has an associated accuracy score, as was described above. New accuracy scores can be determined for the trained predictive models in the repository 215 as new training data is received. More recently received training data may be more representative of the input data that will be received with prediction requests from a particular client computing system. Accordingly, the performance of the trained predictive models using the most representative data may be a better indicator of the current accuracy than the accuracy scores determined from the initial training data. The new accuracy scores can be determined each time new training data is received, when a certain quantity of new data is received, at periodic intervals or otherwise. The new accuracy scores can be determined based on a set of "test data". There are various techniques that can be used to determine what constitutes the test data and how the test data is used in the determination of the new accuracy scores. In the example system shown, the model selection module 210 can determine the new accuracy scores.

In some implementations, the test data used to determine the new accuracy score of a trained predictive model is a combination of the initial training data and the new training data. The following is a formula that can be used to calculate the new accuracy score after receiving n new data sets, where n is an integer greater than 0:

$$A_n = [C_0 + C_1 + \ldots C_n]/[T_0 + T_1 + \ldots T_n]$$

where:
$C_0$=number of correct predictions from initial cross-validation
$C_1$=number of correct predictions from new data set (1)
$C_n$=number of correct predictions from new data set (n)
n=integer greater than 0
$T_0$=total number of data samples in initial cross-validation
$T_1$=total number of new data samples in new data set (1)
$T_n$=total number of new data samples in new data set (n)
$A_n$=new accuracy score after receiving n new data sets The above formula uses a tally (i.e., $C_0$) of the results from the initial cross-validation that was based on the initial training data and adds in the trained predictive model's score on each new data set received since then (i.e., $C_1 \ldots C_n$). The values of $C_0$ through $C_{n-1}$ are values that were calculated in previous iterations of determining the accuracy score for a particular trained predictive model. These values can be stored and then later accessed by the model selection module 210 when the model selection module 210 is determining the new accuracy score $A_n$. The values can be stored, for example, in the training data repository 214 or elsewhere. The value $C_n$ is a new value calculated by the model selection module at the time of determining the new accuracy score $A_n$. The value $C_n$ is determined by testing the accuracy of the trained predictive model in predicting outputs that correspond to the inputs included in the $n^{th}$ new data set. The value of $C_n$ is determined by applying the inputs in the $n^{th}$ data set against a predictive model that was trained with the initial data and new data sets 1 through n-1, but not trained with the $n^{th}$ data set.

By way of illustrative example, consider Model A that was trained with a batch of 100 training samples and has an estimated 67% accuracy as determined from cross-validation. New training data is then received and the training data queue 213 has 10 new training samples. The new training data is used to test the accuracy of Model A. In this example, Model A gets 5 predictive outputs correct and 5 predictive outputs incorrect when tested with the 10 new training samples. The new accuracy score that estimates the accuracy of Model A can be calculated as:

$$A_1 = [67+5]/[100+10] = 65\%.$$

In this particular example, Model A has performed less accurately with the 10 new training samples and the overall accuracy score has decreased from 67% to 65%.

The new accuracy score is determined before the trained predictive model is updated with the data in the training data queue 213 to generate a retrained predictive model, if the trained predictive model is updateable. The predictive model repository 215 is updated, that is, the updateable trained predictive models are retrained using the training data queue 213 (the static trained predictive models are unchanged) and each trained predictive model is associated with its corresponding new accuracy score. The new accuracy score was determined using the previous set of trained predictive models in the repository 215, i.e., before the updating, but was determined using the more recently received training data. That is, the accuracy score was generated using the previous-iteration of trained predictive model (i.e., pre-updating with the new training data that is used as the test data).

In some implementations, the test data used to determine the new accuracy score of a trained predictive model is a weighted combination of the initial training data and the new training data. The following is a formula that can be used to calculate the new accuracy score:

$$A_n = [(C_0 * W_0) + (C_1 * W_1) + \ldots (C_n * W_n)]/[(T_0 * W_0) + (T_1 * W_1) + \ldots (Tn * W_n)]$$

where:
$C_0$=number of correct predictions from initial cross-validation
$C_1$=number of correct predictions from new data set (1)
$C_n$=number of correct predictions from new data set (n)
$W_0$=weight assigned to the initial test data
$W_1$=weight assigned to the new data set (1)
$W_n$=weight assigned to the new data set (n)
$T_0$=total number of data samples in initial cross-validation
$T_1$=total number of new data samples in new data set (1)
$T_n$=total number of new data samples in new data set (n)
n=integer greater than 1
$A_n$=new accuracy score after receiving n new data sets In this implementation, different weights are assigned to the n different data sets that are used in determining the accuracy score. For example, if the newer data is assumed to be more representative of the input data that will be received with future prediction requests, then a higher weight can be assigned to the new test data, i.e., $W_n$, than is assigned to the initial test data, i.e., $W_0$.

In some implementations, the weights to be assigned to the new data sets can be calculated based on an exponential fall-off, with higher weights assigned to the newer data and lower weights assigned to older data. In some implementations, the weight is time-based. For example, the weight for a particular new data set can be based on how many new data sets ago the particular new data set was received. By way of illustration, if n=12, meaning 12 new data sets have been received, and the particular new data set is new data set #5, the weight assigned to new data set #5, i.e., $W_5$, is less than the weight that is assigned to new data set #11 (i.e., the second-last new data set received), i.e., $W_{11}$. Other techniques can be used to assign the weights, and the ones described above are illustrative and non-limiting.

In some implementations, the addition of a new data set means that all previously received data sets are weighed less than before the new addition by a given factor. Over time, this means that the oldest data is weighted significantly less than the newer data. In an illustrative example three new data sets of equal size will be received and weights are determined based on an exponential fall-off of 0.9. When the first new data set is received, i.e., data set (1), the data set (1) is assigned a weight ($W_1$) of 1. When the second data set (2) is received, the data set (1) is now assigned a weight ($W_1$) of 0.9 (i.e., 0.9*1) and data set (2) is assigned a weight ($W_2$) of 1. When the third data set (3) is received, the data set(1) is now assigned a weight ($W_1$) of 0.81 (i.e., (0.9*0.9)) and data set (2) is now assigned a weight ($W_2$) of 0.9, and data set (3) is assigned a weight ($W_3$) of 1. As is illustrated by this example, each previous data set is weighted by a factor of 0.9 less with the introduction of each new data set, an effect that compounds over time.

In some implementations, the test data used to determine the new accuracy score of a trained predictive model is a combination of the most recently received new data set and some, but not all, of the previously received data sets. A sliding time-based window is used to select which data to include in the test data. By way of illustrative, Table 2 below is represents data sets received from a particular client computing system at five different times.

TABLE 2

| Data Set No. | Time Received (relative) | Time Received (actual) |
|---|---|---|
| 0 (initial data set) | $t_0$ | Jan. 1, 2011 |
| 1 | $t_1$ | Jan. 14, 2011 |
| 2 | $t_2$ | Jan. 21, 2011 |
| 3 | $t_3$ | Jan. 22, 2011 |
| 4 | $t_4$ | Jan. 25, 2011 |

In this example, 4 new data sets were received after receipt of the initial data set. In one example, the "sliding window" can move to include a particular number of data sets, for example, three. If the three most recent data sets are used as the "test data", then at time $t_4$, the data sets #2, #3 and #4 are used. The initial data set and the data set #1 are not included in the test data used to determine the accuracy score at time $t_4$. In another example, the "sliding window" can move to include only data sets received within a particular time period. For example, the time period can be two weeks. In this example, at time $t_4$, which is Jan. 25, 2011, only data sets received since Jan. 11, 2011 are included in the test data.

Accordingly, the initial data set, which was received outside of the time period, is not included in the test data, and the data sets received at $t_1$, $t_2$, $t_3$ and $t_4$ are included in the test data.

Once the data to be included in the test data is determined, the accuracy score at time $t_x$ can be determined according to the formula below:

$$A_x[C_{x-(m-1)}+C_{x-(m-2)}+\ldots C_{x-(m-m)}]/[T_{x-(m-1)}+T_{x-(m-2)}+\ldots T_{x-(m-m)}]$$

where:

m=number of data sets to be included in test data at time $t_x$ $C_a$=number of correct predictions from $a^{th}$ data set (e.g., for $C_{x-(m-1)}$, a=x-(m-1) and $C_{x-(m-1)}$ is the number of correct predictions from the $[x-(m-1)]^{th}$ data set);

$T_a$=total number of data samples in $a^{th}$ data set (e.g., for $T_{x-(m-1)}$, a=x-(m-1) and $T_{x-(m-1)}$ is the total number of data samples in the $[x-(m-1)]^{th}$ data set);

$A_x$=new accuracy score at time $t_x$

The value of $C_x$ is determined by testing the $x^{th}$ data set on a predictive model that was trained with data sets 0 through x-1.

Three different implementations are described above for determining what data to include in the test data, where "test data" refers to the data used to determine an accuracy score for a trained predictive model. The test data includes at least some new test data (i.e., test data received after the initial training data) and is determined after receiving the new test data. The new test data can also be used, either alone or together with previously received test data, to update an updateable predictive model included in the repository 215. The repository 215 is updated to include the updated, i.e., retrained updateable predictive models and any static trained predictive models that were also in the repository 215; the previous iteration of updateable trained predictive models are replaced with the new iteration of updateable trained predictive models (i.e., the retrained models). Each trained predictive model included in the updated repository is associated with the new accuracy score, which was determined pre-model-updating. Thus, the accuracy scores associated with the trained predictive models are the accuracy scores of the trained predictive models one-iteration-previous in terms of update-iterations, with respect to the updateable models. For example, an updateable predictive model that has undergone a third iteration of updating with a third new training data set (i.e., was retrained with the third new training data set) is associated with an accuracy score that was determined using the updateable predictive model after having been retrained with the second new training data set.

If the predictive model repository 215 includes one or more static predictive models, that is, trained predictive models that are not updateable with incremental new training data, then those models are not updated during this update phase (i.e., the update phase where an update of only the updateable predictive models occurs). From the trained predictive models available to the client computing system 202, including the "new" retrained predictive models and the "old" static trained predictive models, a trained predictive model can be selected to provide to the client computing system 202. For example, the new accuracy scores associated with the available trained predictive models can be compared, and the most accurate trained predictive model selected. Referring again to FIG. 5, the client computing system 202 can receive access to the selected trained predictive model (Box 506).

In some instances, the selected trained predictive model is the same trained predictive model that was selected and provided to the client computing system 202 after the trained predictive models in the repository 215 were trained with the previous iteration of training data from the training data queue. That is, the most accurate trained predictive model from those available may remain the same even after an update. In other instances, a different trained predictive model is selected as being the most accurate.

Changing the trained predictive model that is accessible by the client computing system 202 can be invisible to the client computing system 202. That is, from the perspective of the client computing system 202, input data and a prediction request is provided to the accessible trained predictive model (Box 508). In response, a predictive output is received by the client computing system 202 (Box 510). The selected trained predictive model is used to generate the predictive output based on the received input. However, if the particular trained predictive model being used system-side changes, this can make no difference from the perspective of the client computing system 202, other than, a more accurate model is being used and therefore the predictive output should be correspondingly more accurate as a prediction.

From the perspective of the client computing system 202, updating the updateable trained predictive models is relatively simple. The updating can be all done remote from the client computing system 202 without expending client computing system resources. In addition to updating the updateable predictive models, the static predictive models can be "updated". The static predictive models are not actually "updated", but rather new static predictive models can be generated using training data that includes new training data. Updating the static predictive models is described in further detail below in reference to FIG. 7.

Figure 6:
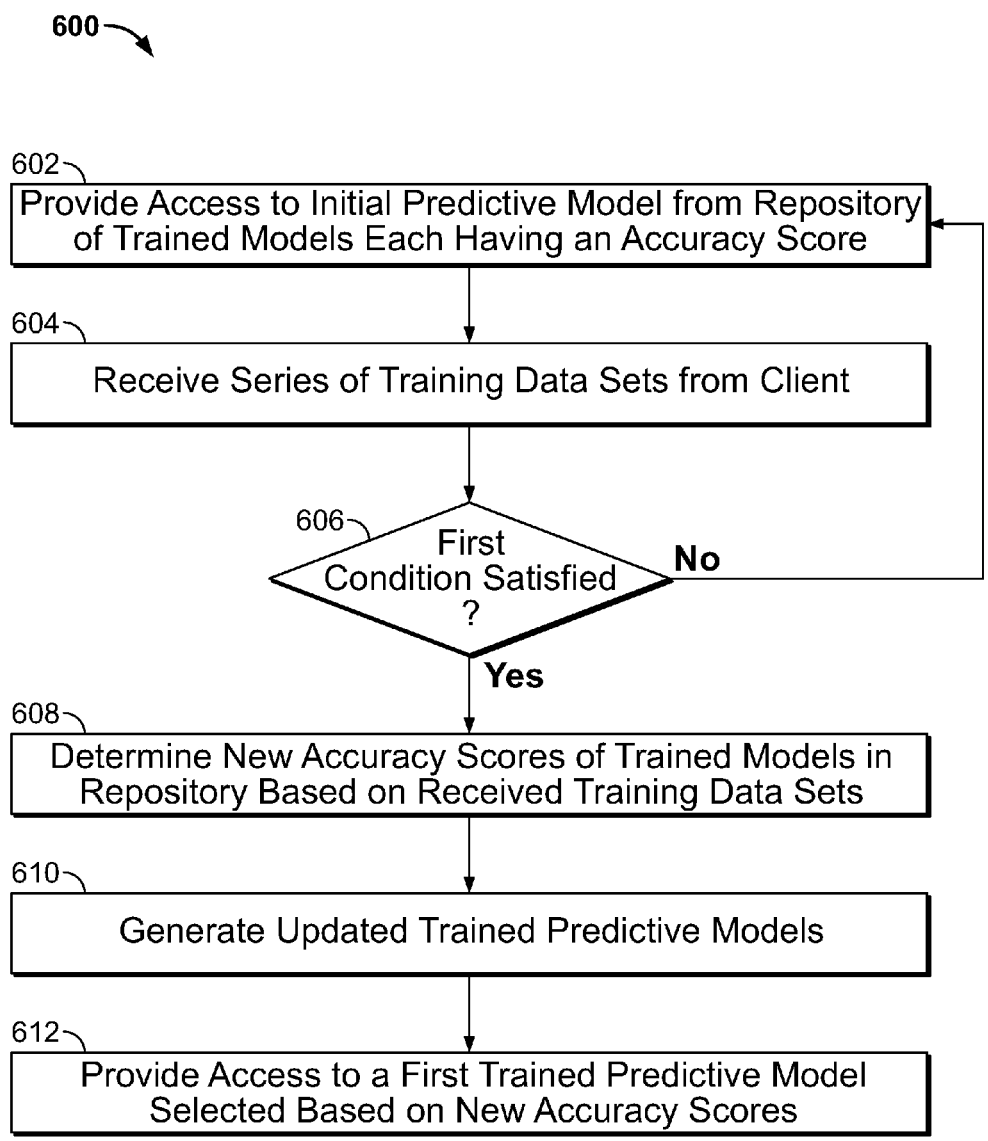
FIG. 6 is a flowchart showing an example process for rescoring accuracy of trained predictive models and retraining updateable trained predictive models using the predictive analytic platform.

FIG. 6 is a flowchart showing an example process 600 for rescoring accuracy of trained predictive models and retraining updateable trained predictive models using the predictive analytic platform. For illustrative purposes, the process 600 is described in reference to the predictive modeling server system 206 of FIG. 2, although it should be understood that a differently configured system could perform the process 600. The process 600 begins with providing access to an initial trained predictive model (e.g., trained predictive model 218) that was trained with initial training data (Box 602). That is, for example, operations such as those described above in reference to boxes 402-412 of FIG. 4 can have already occurred such that a trained predictive model has been selected (e.g., based on accuracy) and access to the trained predictive model has been provided, e.g., to the client computing system 202.

A series of training data sets are received from the client computing system 202 (Box 604). For example, as described above, the series of training data sets can be received incrementally or can be received together as a batch. The series of training data sets can be stored in the training data queue 213. When a first condition is satisfied ("yes" branch of box 606), then an update of updateable trained predictive models stored in the predictive model repository 215 occurs. Until the first condition is satisfied ("no" branch of box 606), access can continue to be provided to the initial trained predictive model (i.e., box 602) and new training data can continue to be received and added to the training data queue 213 (i.e., box 604).

The first condition that can trigger an update of updateable trained predictive models can be selected to accommodate various considerations. Some example first conditions were already described above in reference to FIG. 5. That is, receiving new training data in and of itself can satisfy the first condition and trigger the update. Receiving an update request from the client computing system 202 can satisfy the first condition. Other examples of first condition include a threshold size of the training data queue 213. That is, once the volume of data in the training data queue 213 reaches a threshold size, the first condition can be satisfied and an update can occur. The threshold size can be defined as a predetermined value, e.g., a certain number of kilobytes of data, or can be defined as a fraction of the training data included in the training data repository 214. That is, once the amount of data in the training data queue is equal to or exceeds x % of the data used to initially train the trained predictive model 218 or x % of the data in the training data repository 214 (which may be the same, but could be different), the threshold size is reached. In another example, once a predetermined time period has expired, the first condition is satisfied. For example, an update can be scheduled to occur once a day, once a week or otherwise. In another example, if the training data is categorized, then when the training data in a particular category included in the new training data reaches a fraction of the initial training data in the particular category, then the first condition can be satisfied. In another example, if the training data can be identified by feature, then when the training data with a particular feature reaches a fraction of the initial training data having the particular feature, the first condition can be satisfied (e.g., widgets X with scarce property Y). In yet another example, if the training data can be identified by regression region, then when the training data within a particular regression region reaches a fraction of the initial training data in the particular regression region (e.g., 10% more in the 0.0 to 0.1 predicted range), then the first condition can be satisfied. The above are illustrative examples, and other first conditions can be used to trigger an update of the updateable trained predictive models stored in the predictive model repository 215.

Before the updateable trained predictive models that are stored in the repository 215 are "updated" with the training data stored in the training data queue 213, each trained predictive model in the repository 215 can be rescored for accuracy. That is, new accuracy scores of the trained models in the repository are determined based on the received training data sets stored in the training data queue 213 (Box 608). The new accuracy scores are determined using test data. The test data can include the data in the training data queue 213 in addition to previously received training data that is stored in the training data repository 214. The techniques described above in reference to FIG. 5 to determine what to include in the test data and how to calculate the new accuracy scores can be employed here to determine the new accuracy scores. For example, the test data can be a combination of all previously received training data weighted equally or weighted differently, or a sliding window can be used to select only more current data sets to include in the test data.

The updateable trained predictive models that are stored in the repository 215 are "updated" with the training data stored in the training data queue 213. That is, retrained predictive models are generated (Box 610) using: the training data queue 213; the updateable trained predictive models obtained from the repository 215; and the corresponding training functions that were initially used to train the updateable trained predictive models, which training functions are obtained from the training function repository 216.

A trained predictive model is selected from the multiple trained predictive models based on their respective new accuracy scores. That is, the new accuracy scores of the trained predictive models stored in the repository 215 can be compared and the most accurate model, i.e., a first trained predictive model, selected. Access is provided to the first trained predictive model to the client computing system 202 (Box 612). As was also discussed above, the first trained predictive model may end up being the same model as the initial trained predictive model that was provided to the client computing system 202 in Box 602. That is, even after rescoring the accuracy, the initial trained predictive model may still be the most accurate model. In other instances, a different trained predictive model may end up being the most accurate, and therefore the trained predictive model to which the client computing system 202 has access changes after the update. Of the multiple retrained predictive models that were trained as described above, some or all of them can be stored in the predictive model repository 215.

In the above example process 600, the new accuracy scores are determined once the first condition is satisfied and before the updateable trained predictive models are updated (i.e., retrained). In other implementations, determining new accuracy scores and selecting the most accurate model based on the new accuracy scores occurs independent of updating the updateable trained predictive models. That is, the new accuracy scores can be calculated each time new data is received into the training data queue 213, whether or not the first condition has been satisfied to trigger an updating of the updateable predictive models in the repository 215. If, based on the new accuracy scores, a trained predictive model is found the most accurate that is different than the trained predictive model being provided at that time to the client computing system, then the client computing system can be provided access to the different trained predictive model that is found, at that time, to have the highest accuracy score. As such, the trained predictive model to which the client computing system is provided access can change even if an update to the updateable trained predictive models has not yet occurred.

In the implementations described above, the first trained predictive model is hosted by the dynamic predictive modeling server system 206 and can reside and execute on a computer at a location remote from the client computing system 202. However, as described above in reference to FIG. 4, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the first trained predictive model 218 is provided to a client computing system 202 or elsewhere, and can be used locally by the client entity.

Figure 7:
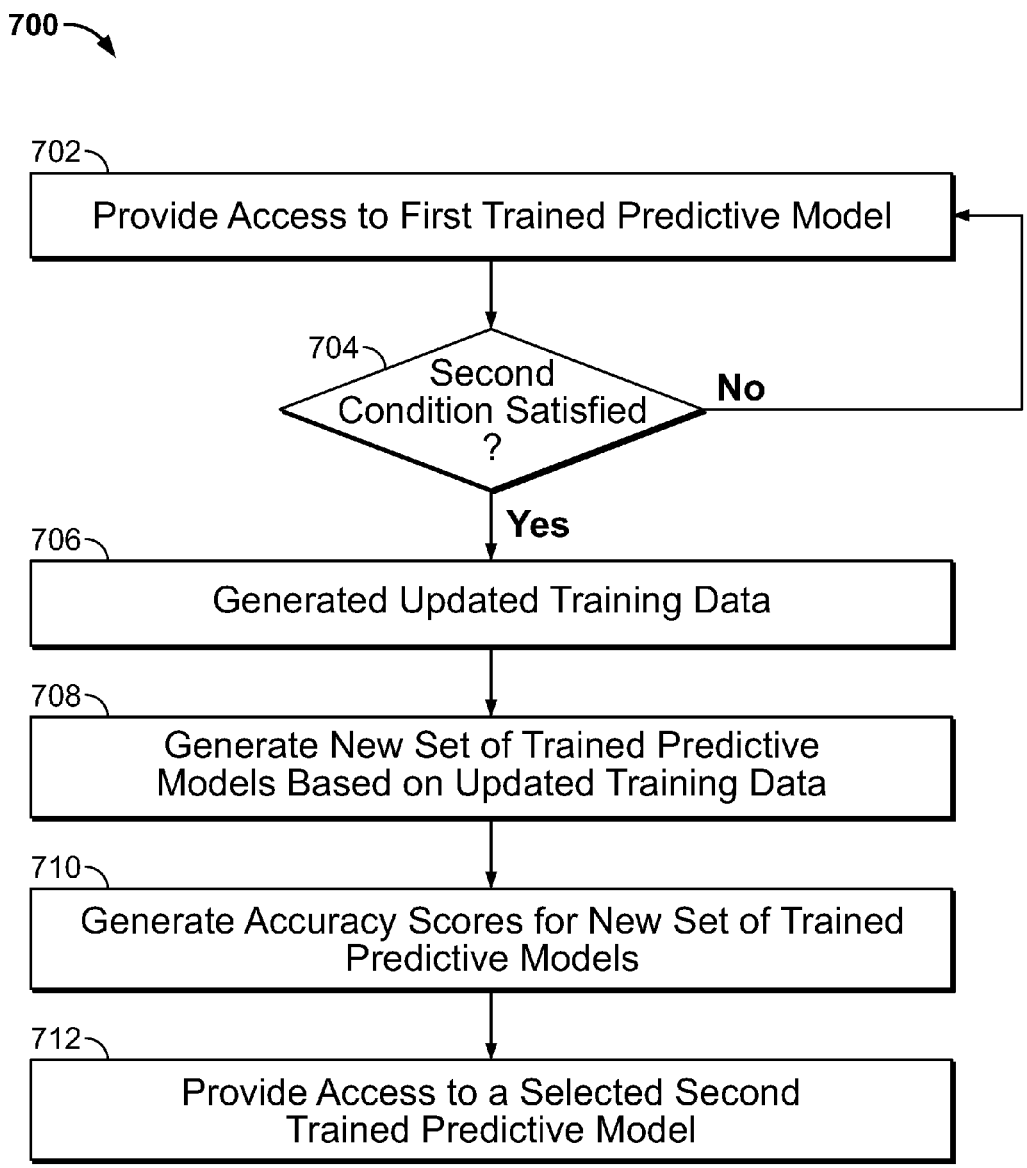
FIG. 7 is a flowchart showing an example process for generating a new set of trained predictive models using updated training data.

FIG. 7 is a flowchart showing an example process 700 for generating a new set of trained predictive models using updated training data. For illustrative purposes, the process 700 is described in reference to the predictive modeling server system 206 of FIG. 2, although it should be understood that a differently configured system can perform the process 700. The process 700 begins with providing access to a first trained predictive model (e.g., trained predictive model 218) (Box 702). That is, for example, operations such as those described above in reference to boxes 602-612 of FIG. 6 can have already occurred such that the first trained predictive model has been selected (e.g., based on accuracy) and access to the first trained predictive model has been provided, e.g., to the client computing system 202. In another example, the first trained predictive model can be a trained predictive model that was trained using the initial training data. That is, for example, operations such as those described above in reference to boxes 402-412 of FIG. 4 can have already occurred such that a trained predictive model has been selected (i.e., the first trained predictive model) and access to the first trained predictive model has been provided. Typically, the process 700 occurs after some updating of the updateable trained predictive models has already occurred (i.e., after process 600), although that is not necessarily the case.

Referring again to FIG. 7, when a second condition is satisfied ("yes" branch of box 704), then an "update" of some or all the trained predictive models stored in the predictive model repository 215 occurs, including the static trained predictive models. This phase of updating is more accurately described as a phase of "regeneration" rather than updating. That is, the trained predictive models from the repository 215 are not actually updated, but rather a new set of trained predictive models are generated using different training data then was used to initially train the models in the repository (i.e., the different than the initial training data in this example).

Updated training data is generated (Box 706) that will be used to generate the new set of trained predictive models. In some implementations, the training data stored in the training data queue 213 is added to the training data that is stored in the training data repository 214. The merged set of training data can be the updated training data. Such a technique can work well if there are no constraints on the amount of data that can be stored in the training data repository 214. However, in some instances there are such constraints, and a data retention policy can be implemented to determine which training data to retain and which to delete for purposes of storing training data in the repository 214 and generating the updated training data. The data retention policy can define rules governing maintaining and deleting data. For example, the policy can specify a maximum volume of training data to maintain in the training data repository, such that if adding training data from the training data queue 213 will cause the maximum volume to be exceeded, then some of the training data is deleted. The particular training data that is to be deleted can be selected based on the date of receipt (e.g., the oldest data is deleted first), selected randomly, selected sequentially if the training data is ordered in some fashion, based on a property of the training data itself, or otherwise selected.

A particular illustrative example of selecting the training data to delete based on a property of the training data can be described in terms of a trained predictive model that is a classifier and the training data is multiple feature vectors. An analysis can be performed to determine ease of classification of each feature vector in the training data using the classifier. A set of feature vectors can be deleted that includes a larger proportion of "easily" classified feature vectors. That is, based on an estimation of how hard the classification is, the feature vectors included in the stored training data can be pruned to satisfy either a threshold volume of data or another constraint used to control what is retained in the training data repository 214.

For illustrative purposes, in one example the updated training data can be generated by combining the training data in the training data queue together with the training data already stored in the training data repository 216 (e.g., the initial training data). In some implementations, the updated training data can then be stored in the training data repository 214 and can replace the training data that was previously stored (to the extent that the updated training data is different). In some implementations, the training data queue 213 can be cleared to make space to new training data to be received in the future.

A new set of trained predictive models is generated using the updated training data and using training functions that are obtained from the training function repository 216 (Box 708). The new set of trained predictive models includes at least some updateable trained predictive models and can include at least some static trained predictive models.

The accuracy of each trained predictive model in the new set can be estimated, for example, using techniques described above (Step 710) and an accuracy score generated.

A second trained predictive model can be selected to which access is provided to the client computing system 202 (Box 712). In some implementations, the accuracy scores of the new trained predictive models and the trained predictive models stored in the repository 215 before this updating phase began are all compared and the most accurate trained predictive model is selected as the second trained predictive model. In some implementations, the trained predictive models that were stored in the repository 215 before this updating phase began are discarded and replaced with the new set of trained predictive models, and the second trained predictive model is selected from the trained predictive models currently stored in the repository 215. In some implementations, the static trained predictive models that were stored in the repository 215 before the updating phase began are replaced by their counterpart new static trained predictive models. The updateable trained predictive models that were stored in the repository 215 before the updating phase are either replaced by their counterpart new trained predictive model or maintained, depending on which of the two is more accurate. The second trained predictive model then can be selected from among the trained predictive models stored in the repository 215.

In some implementations, only a predetermined number of predictive models are stored in the repository 215, e.g., n (where n is an integer greater than 1), and the trained predictive models with the top n accuracy scores are selected from among the total available predictive models, i.e., from among the new set of trained predictive models and the trained predictive models that were stored in the repository 215 before the updating phase began. Other techniques can be used to determine which trained predictive models to store in the repository 215 and which pool of trained predictive models is used from which to select the second trained predictive model.

Referring again to Box 704, until the second condition is satisfied which triggers the update of all models included in the repository 215 with updated training data ("No" branch of box 704), the client computing system 202 can continue to be provided access to the first trained predictive model.

Figure 8:
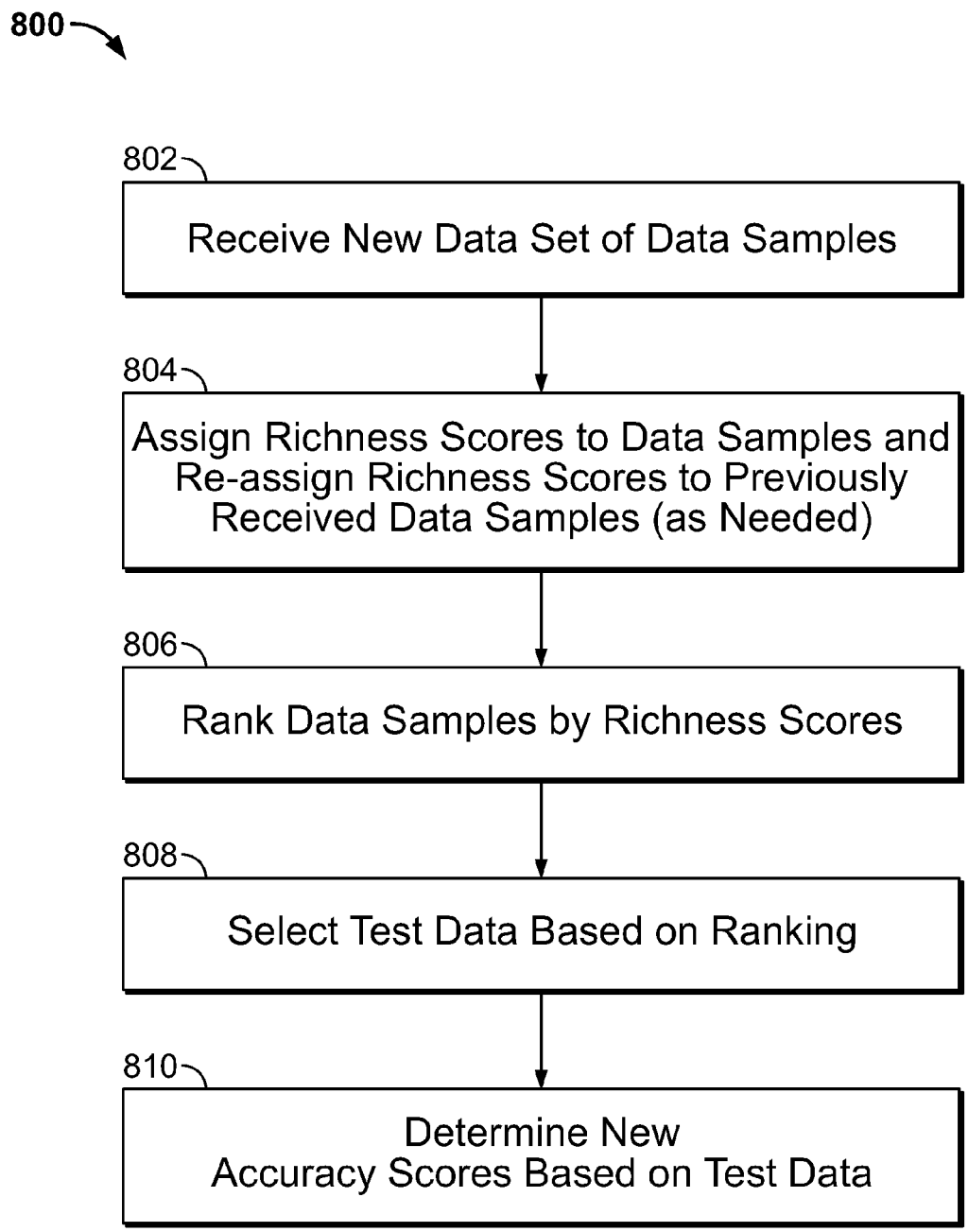
FIG. 8 is a flowchart showing an example process for selecting test data to use in determining accuracy scores.

FIG. 8 is a flowchart showing an example process 800 for selecting test data to use in determining accuracy scores. Example techniques are described above for selecting and/or weighting test data that is used to determine accuracy scores for trained predictive models stored in the repository 215. The example process 800 is another technique for selecting test data that is based on a "richness score" assigned to each retained data sample. For example, the retained data samples can be previously received data samples stored in the training data repository 214 and newly received data samples stored in the training data queue 213.

The "richness score" is a score that indicates how information-rich a particular data sample is in comparison to other retained data samples for purposes of testing the accuracy of a trained predictive model. A test data set can be selected based on the richness scores, where the test data set is optimized to give an estimate of the trained predictive model's accuracy across an entire data set from which the trained predictive model is derived. An updateable trained predictive model may have been retrained in multiple iterations using multiple updates of training data (i.e., which comprise, together with the initial training data, the entire data set from which the trained predictive model is derived) received at multiple different times. The richness scores of data samples can be used to select a test data set that is a representative sample of the entire data set from which the trained predictive model is derived, and an accuracy score determined using such a test data set can be in turn be a better estimate of the accuracy of the trained predictive model.

By way of example, if multiple data samples are clustered together, e.g., exhibit a high degree of similarity in features, then a small number of the data samples in the cluster can be given a relatively higher richness score then the rest in the cluster, which can be given a relatively low richness score on account of their redundancy. By comparison, a data sample whose nearest neighbor (when comparing features) is a data sample having a different output value is considered an information-rich data sample. That is, two data samples that are highly similar but have different outputs are a rich source of information, e.g., for a classifier type trained predictive model, and should be assigned relatively high richness scores.

Figure 9:
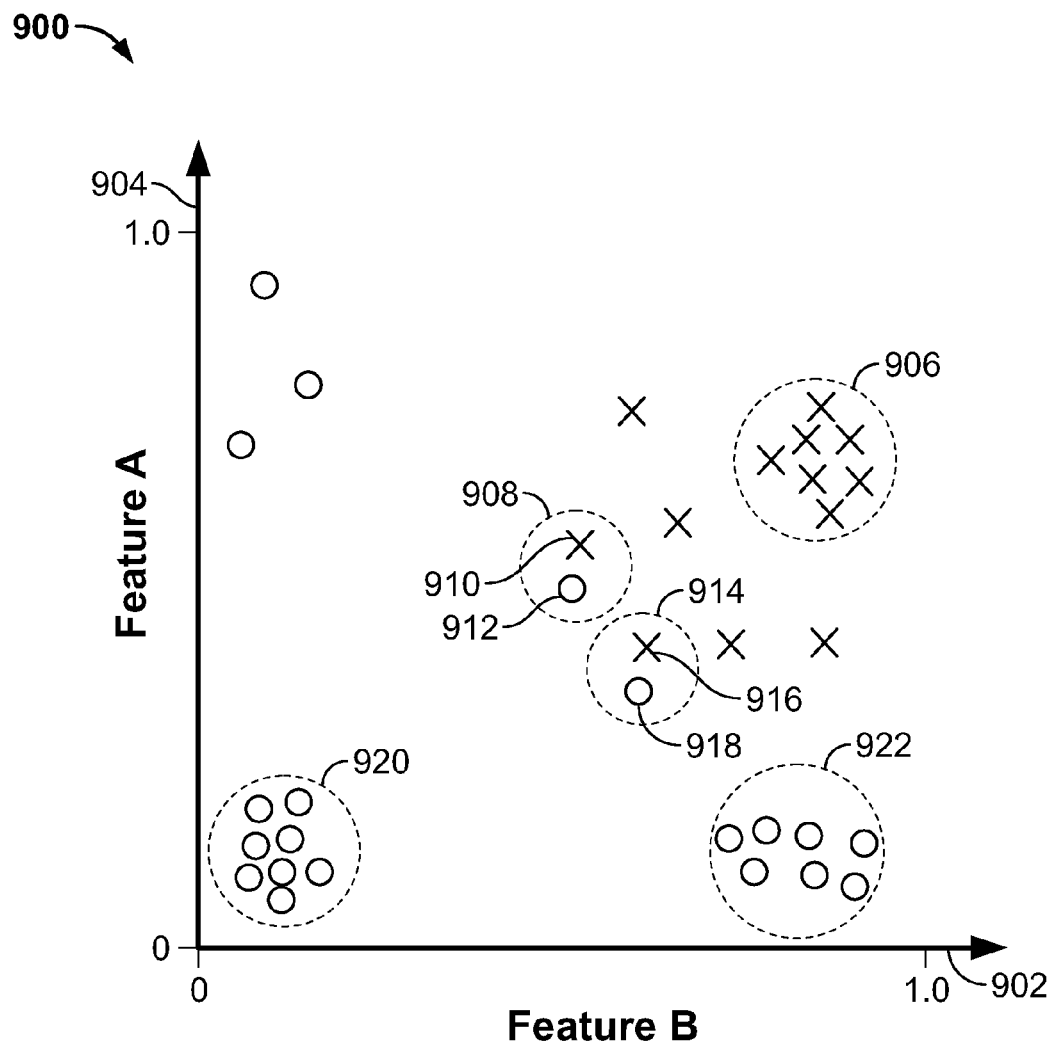
FIG. 9 is a schematic representation of data samples classified by two dimensions.

FIG. 9 is a schematic representation of data samples 900 classified by two dimensions. In this illustrative example, the trained predictive model is a classifier and, in response to receiving a particular input, an output is generated that makes a classification based on the input. The example shown is simple in that a classification is made based on two features, i.e., feature A and feature B. In this example, the trained predictive model predicts whether an input describes a giraffe or doesn't describe a giraffe (i.e., the classification is "giraffe" or "not a giraffe"). Feature A is a neck length and feature B is a density of spots on an animal. Generally speaking, a giraffe has a relatively long neck length and a relatively dense number of spots. In the schematic representation in FIG. 9, a neck length (feature A) is given a value ranging from 0 to 1, where 0 indicates no neck and 1 indicates a long neck. The density of spots, feature B, is also given a value ranging from 0 to 1, where 0 indicates no spots and 1 indicates high density of spots. Each data sample in a set of training samples includes input data and corresponding output data. In this example, the input data includes an A value and a B value for a given animal and the corresponding output data indicates whether the animal having these A and B values is a giraffe or is not a giraffe.

Data samples that represent a "giraffe" are shown as an X in FIG. 9 and data samples that represent "not a giraffe" are shown as an O in FIG. 9. As might be expected, there is a cluster of X data samples that have a relatively high feature A value and a relatively high feature B value. That is, a number of animals that have a long neck length and high spot density are classified as giraffes and shown as X's, for example, those in the cluster 906. Also as might be expected, there is a cluster of O data samples that have a relatively low feature A value and a relatively low feature B value. That is, a number of animals that have a short neck length and a low spot density are classified as "not a giraffe" and shown as O's, for example, those in cluster 920. Additionally, a number of animals that have a short neck length and a high spot density are classified as "not a giraffe" and shown as O's, e.g., those in cluster 922. An example of such an animal is a leopard, which although has a high density of spots has a short neck relative to a giraffe and is classified as "not a giraffe" (because it is in fact a leopard).

When there are a number data samples within a cluster, e.g., clusters 906, 920 and 922, there is value in retaining a portion of these data samples, however, retaining all of them is of less value on account of the redundancy between the data samples. Accordingly, a portion of the data samples in a cluster can be assigned a relatively high richness score as compared to the rest of the data samples in the cluster. Various techniques can be used to determine which data samples in the cluster are assigned the relatively high richness scores. In one example, a time-based approach can be used, where the portion is selected based on how recently they were received, with a preference to the more recent data samples. In other examples, the data samples at the edge of a cluster can be scored higher than those in the middle or visa versa or a random selection of data samples from a cluster can be scored higher.

In another example, a data sample is selected to be assigned a richness score of 0 (i.e., to effectively remove the data sample from the test data) based on whether removal of the data sample will increase the overall score of the data samples. That is, if the data sample had a richness score of x and is removed from the test data (i.e., assigned a richness score of 0), then a determination can be made as to whether removing the data sample will have the effect of increasing the sum of richness scores of those data samples near the data sample will increase by a total value of x. For example, if the data sample had a richness score of 0.2 and is near two other data samples with richness scores of 0.25, then if once the data sample's richness score is reduced to 0, the two neighboring data samples' scores increase by a total of 0.2 (e.g., 0.1 each or otherwise), then the data sample can be removed but the information retained (i.e., by the increase in scores of neighboring data samples).

A data sample whose nearest neighbor in the schematic representation is a data sample having a different classification is an information-rich data sample. For example, consider the data samples at 908, being data sample X 910 and data sample Y 912. Data sample X has a "giraffe" classification whereas data sample O has a "not a giraffe" classification. However, the input data for both data sample 910 and data sample 912 are relatively similar. That is, these data samples have relatively similar feature A and feature B values, yet they correspond to different classifications of animal, one being a giraffe and the other not being a giraffe. If input data was received with a predication request that had similar feature A and feature B values, the input data could be borderline "giraffe" or "not a giraffe", i.e., a hard classification to make. Having data samples that have borderline features values can therefore be informative when testing the accuracy of a trained predictive model in making predictions, particularly in borderline cases. Accordingly, these data samples are considered information-rich and are assigned relatively high richness scores. The data samples at 914, i.e., data sample X 916 and data sample O 918 are also considered information-rich for the same reason and assigned relatively high richness scores.

Other data samples shown in FIG. 9 that are not included in any of the clusters or pairings discussed above may also be information-rich, as these data samples are relatively far away from their nearest neighbor. The richness score can be assigned to the data samples as a value between 0 and 1, for example, where a 1 is assigned for the most information-rich data samples and a 0 is assigned for data samples that are not desired to be included in the test data, e.g., some of the data samples included in a cluster.

In some implementations, the richness score (RS) for a data sample can be determined as follows:

RS=[1+No. of Nearby Different]/[No. of Nearby Total]

where:
RSA=Richness score for Data Sample A;
No. of Nearby Different=number of data samples near data sample A that have a different output value than data sample A (i.e., are different);
No. of Nearby Total=total number of data samples that are near data sample A In some implementations, the formula above can be modified to include a constant, e.g., 1, added to the denominator. The RS for a data sample that has no nearby data samples thereby ends up with an RS of 1, which is suiting because such a lone data sample can be information rich. Other formulas can be used to determine the richness score and the formula described above is but one example.

Referring again to FIG. 8, as was previously discussed, new data sets of data samples can be received periodically, continually or on an ad hoc basis. The process 800 begins with the receipt of a new data set of data samples (Step 802). A richness score is assigned to the data samples included in the new data set (Step 804). Additionally, because the receipt of the new data samples may change the richness score of one or more other data samples that were previously received and retained, the richness scores of the one or more other data samples may be re-assigned (Step 806). By way of illustrative example, if the new data set included data sample X 910, and the data sample O 912 was previously received, then the richness score of data sample O 912 may change. Data sample O 912, after the receipt of data sample X 910, is now positioned very near a data sample having an opposite output value, i.e., "giraffe" as compared to the "not a giraffe" output of data sample O 912. Accordingly, as discussed above, because of these pairing of opposite data samples, the richness of data sample O 912 increases and the richness score for previously received data sample O 912 is re-assigned (Step 804).

The data samples can be ranked based on their assigned richness scores (Step 806), where the highest ranked data samples have the highest richness scores. A set of test data to be used to test the accuracy of trained predictive models, e.g., the trained predictive models in the repository 215, is selected based on the ranking (Step 808). For example, the top "n" data samples can be selected, being the data samples having the top "n" richness scores, where "n" is an integer greater than 1.

The trained predictive models are then tested using the selected test data to access their accuracy and to assigned an updated new accuracy score (Step 810). In some implementations, a tally of the correct predictive outputs generated using the selected test data can be used to determine the new accuracy score, which replaces a previously determined accuracy score.

Various techniques are described above for determining accuracy scores of trained predictive models retained in the repository 215 in reference to FIGS. 5 and 8. In some implementations, more than one technique can be used. After a series of new data sets with a relatively small number of data samples are received and used to update the updateable trained predictive models, an updateable trained predictive model can tend to drift away from the initial training data set. Accordingly, it can be advantageous to periodically test the updateable trained predictive model using a sampling of the previously received data, including data samples from the initial training data. At these times, the richness score technique for ranking data samples and selecting a set of test data based on the highest richness score can be used to determine the accuracy scores. That is, for every "m" new data sets received (where m is an integer greater than 0), the new accuracy scores can be determined using various techniques, including those described above in reference to FIG. 5. Then after the $m^{th}$ new data set, accuracy score can then be determined using the richness score technique described above in references to FIGS. 8 and 9. The process can then repeat, that is, for the next $m^{th}$ data sets received, the new accuracy scores can be determined using a technique such as described above in reference to FIG. 5, and then again after the next m$^{th}$ data set, a richness score technique can be used.

The various techniques described above for determining an accuracy score for a trained predictive model describe using a new data set as test data, which data can then later be used as training data to retain the trained predictive model. That is, for a new data set (x) received at time $t_x$, the new data set (x) can be used to test a trained predictive model that was trained at time $t_{x-1}$ with data sets 0 through x-1. In some implementations, when a new data set (x) is received, the new data set can be apportioned into a new test data set (x) and a new training data set (x). The portion allocated as the new test data set (x) can be used to test a trained predictive model that was trained at time $t_{x-1}$ with data sets 0 through x-1, as described above. Alternatively, the trained predictive model can be first updated (i.e., retrained) using portion allocated as the new training data set (x). The retrained predictive model then can be tested using the new test data set (x). Thus in this implementation, the new test data (x) is used to test the trained predictive model that was trained at time $t_x$ with data sets 0 through x (or at least a portion of each such data set).

Referring again to FIG. 9, a schematic representation of data samples 900 that are classified by two dimensions is shown and described in the context of assigning a richness score to each data sample. The richness score is assigned to a data sample to indicate how information-rich the data sample is when used as test data to test a trained predictive model. In some implementations, a second richness score can be assigned to each data sample to indicate how information-rich the data sample is when used as training data to train (or re-train) a predictive model. The second richness score is referred to herein as the training-richness-score, so as to differentiate from the richness score described above for test data purposes.

The training-richness-score can indicate how information-rich a particular data sample is in comparison to other retained training data samples. For example, referring again to FIG. 2, if training data is accumulating in the training data queue 213 of system 200, and has not yet been used to retrain the updateable trained predictive models in the repository 215, the training-richness-scores can be used to rank the training data samples in the queue 213. Based on the ranking, a set of training data can be selected from the training data queue 213 and used to retrain the updateable trained predictive models or regenerate a new set of static trained predictive models from the repository 215 (e.g., as described in reference to FIG. 7). The training data samples that are not selected to be used can be discarded or otherwise ignored, e.g., if there is a limitation on memory space.

The training-richness-score for a particular data sample can be different than the richness score determined for testing purposes. That is, the criteria for a data sample to be information-rich for training purposes can be different from the criteria for a data sample to be information-rich for testing purposes. Training data may be scored for richness so that the amount of training data retained in the training data repository 214 can be kept to a desired volume, e.g., on account of memory space restrictions. The training-richness-score can be also used to optimize what training samples are used to train and retrain models, so as to provide optimally trained predictive models in view of the input data expected to be received going forward with prediction requests. As is already described above, the test data set is used to test the accuracy of a trained predictive model before the data samples included in the test data set are used to train (or retrain) the trained predictive model. As such, whether the same richness scores are assigned to a particular data sample for testing or training purposes or not, when selecting data samples for either data set (i.e., for test or training data sets), adherence to the rule of testing before training can avoid conflicts.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving a first data set of data samples, each data sample comprising input data and corresponding output data, wherein the first data set is new relative to (i) an initial training data set and (ii) a plurality of previously received update data sets of data samples, wherein the initial training data set was used to train each trained predictive model in a repository of trained predictive models, at least some which are updateable, and wherein the plurality of previously received update data sets of the data sample were used to retrain one or more updateable trained predictive models in the repository;
assigning a richness score to each of the data samples included in the first data set and to each of a set of retained data samples from the initial training data and the plurality of previously received update data sets, wherein the richness score for a particular data sample indicates how information rich the particular data sample is, relative to other data samples in the set of retained data samples and the first data set, for determining an accuracy of a trained predictive model;
ranking the data samples included in the first data set and the set of retained data samples based on the assigned richness scores;
selecting a first set of test data from the data samples included in the first data set and the set of retained data samples based on the ranking;
testing how accurate each of the trained predictive models in the repository is in determining predictive output data for given input data using the first set of test data and determining respective accuracy scores for each of the trained predictive models based on the testing; and
selecting a first trained predictive model from the repository based on the accuracy scores and providing access to the first trained predictive model to a client computing system for generating predictive output data based on input data received from the client computing system.

2. The method of claim 1, further comprising:
after determining accuracy scores for each of the trained predictive models, retraining each of the updateable trained predictive models included in the repository using the first data set; and
updating the repository to replace the updateable trained predictive models with the retrained predictive models, where each retrained predictive model is associated with the accuracy score determined for the trained predictive model from which the retrained predictive model was derived.

3. The method of claim 1, wherein assigning a richness score to the particular data sample comprises determining the richness score based on how many data samples have similar input data but different output data than the particular data sample and based on how many data samples have similar input data and similar or different output data than the particular data sample.

4. The method of claim 1, wherein selecting the first set of test data from the data samples comprises selecting the top $n^{th}$ ranked data samples where n is an integer greater than one.

5. The method of claim 1, wherein:
testing how accurate the trained predictive model is in determining predictive output data for given input data using the first set of test data comprises generating predictive output data for the input data included in the data samples of the first set of test data; and
determining an accuracy score based on the testing comprises comparing the predictive output data to the output data included the data samples that correspond to the input data used to generate the predictive output data and determining the accuracy score based on the comparison.

6. The method of claim 1, further comprising:
after determining the accuracy score for the trained predictive model, retraining the trained predictive model using the first data set of data samples.

7. A computer-implemented system comprising:
one or more computers; and
one or more data storage devices coupled to the one or more computers, storing:
a training data repository that includes a set of retained data samples, wherein the set of retained data samples includes at least some data samples from an initial training data set and some data samples from a plurality of previously received update data sets, wherein each data sample includes input data and corresponding output data;
a predictive model repository that includes trained predictive models that were each trained with the initial training data set, wherein at least some of the trained predictive models are updateable and were each retrained with the plurality of previously received update data sets, and
instructions that, when executed by the one or more computers, cause the one or more computers to perform operations comprising:
receiving a first data set of data samples, each data sample comprising input data and corresponding output data, wherein the first data set is new relative to (i) the initial training data set and (ii) the plurality of previously received update data sets;
assigning a richness score to each of the data samples included in the first data set and to each of the set of retained data samples included in the training data repository, wherein the richness score for a particular data sample indicates how information rich the particular data sample is, relative to other data samples in the set of retained data samples and the first data set, for determining an accuracy of a trained predictive model;
ranking the data samples included in the first data set and the retained data samples based on the assigned richness scores;
selecting a first set of test data from the data samples included in the first data set and the set of retained data samples based on the ranking;
testing how accurate each of the trained predictive models in the repository is in determining predictive output data for given input data using the first set of test data and determining respective accuracy scores for each of the trained predictive models based on the testing; and
selecting a first trained predictive model from the repository based on the accuracy scores and providing access to the first trained predictive model to a client computing system for generating predictive output data based on input data received from the client computing system.

8. The system of claim 7, wherein the operations further comprise:
after determining accuracy scores for each of the trained predictive models, retraining each of the updateable trained predictive models included in the repository using the first data set; and
updating the repository to replace the updateable trained predictive models with the retrained predictive models, where each retrained predictive model is associated with the accuracy score determined for the trained predictive model from which the retrained predictive model was derived.

9. The system of claim 7, wherein assigning a richness score to the particular data sample comprises determining the richness score based on how many data samples have similar input data but different output data than the particular data sample and based on how many data samples have similar input data and similar or different output data than the particular data sample.

10. The system of claim 7, wherein selecting the first of test data from the data samples comprises selecting the top $n^{th}$ ranked data samples where n is an integer greater than one.

11. The system of claim 7, wherein:
testing how accurate the trained predictive model is in determining predictive output data for given input data using the first set of test data comprises generating predictive output data for the input data included in the data samples of the first set of test data; and
determining an accuracy score based on the testing comprises comparing the predictive output data to the output data included the data samples that correspond to the input data used to generate the predictive output data and determining the accuracy score based on the comparison.

12. The system of claim 7, further comprising:
after determining the accuracy score for the trained predictive model, retraining the trained predictive model using the first data set of data samples.

13. A computer-readable storage device encoded with a computer program product, the computer program product comprising instructions that when executed on one or more computers cause the one or more computers to perform operations comprising:
receiving a first data set of data samples, each data sample comprising input data and corresponding output data, wherein the first data set is new relative to (i) an initial training data set and (ii) a plurality of previously received update data sets of data samples, wherein the initial training data set was used to train each trained predictive model in a repository of trained predictive models, at least some which are updateable, and wherein the plurality of previously received update data sets of the data sample were used to retrain one or more updateable trained predictive models in the repository;
assigning a richness score to each of the data samples included in the first data set and to each of a set of retained data samples from the initial training data and the plurality of previously received update data sets, wherein the richness score for a particular data sample indicates how information rich the particular data sample is, relative to other data samples in the set of retained data samples and the first data set, for determining an accuracy of a trained predictive model;
ranking the data samples included in the first data set and the set of retained data samples based on the assigned richness scores;
selecting a first set of test data from the data samples included in the first data set and the set of retained data samples based on the ranking;
testing how accurate each of the trained predictive models in the repository is in determining predictive output data for given input data using the first set of test data and determining respective accuracy scores for each of the trained predictive models based on the testing; and
selecting a first trained predictive model from the repository based on the accuracy scores and providing access to the first trained predictive model to a client computing system for generating predictive output data based on input data received from the client computing system.

14. The computer-readable storage device of claim 13, the operations further comprising:
after determining accuracy scores for each of the trained predictive models, retraining each of the updateable trained predictive models included in the repository using the first data set; and
updating the repository to replace the updateable trained predictive models with the retrained predictive models, where each retrained predictive model is associated with the accuracy score determined for the trained predictive model from which the retrained predictive model was derived.

15. The computer-readable storage device of claim 13, wherein assigning a richness score to the particular data sample comprises determining the richness score based on how many data samples have similar input data but different output data than the particular data sample and based on how many data samples have similar input data and similar or different output data than the particular data sample.

16. The computer-readable storage device of claim 13, wherein selecting the first set of test data from the data samples comprises selecting the top $n^{th}$ ranked data samples where n is an integer greater than one.

17. The computer-readable storage device of claim 13, wherein:

testing how accurate the trained predictive model is in determining predictive output data for given input data using the first set of test data comprises generating predictive output data for the input data included in the data samples of the first set of test data; and determining an accuracy score based on the testing comprises comparing the predictive output data to the output data included the data samples that correspond to the input data used to generate the predictive output data and determining the accuracy score based on the comparison.

18. The computer-readable storage device of claim 13, the operations further comprising:

after determining the accuracy score for the trained predictive model, retraining the trained predictive model using the first data set of data samples.

* * * * *

UNITED STATES PATENT AND TRADEMARK OFFICE
CERTIFICATE OF CORRECTION

PATENT NO. : 8,533,224 B2
APPLICATION NO. : 13/101048
DATED : September 10, 2013
INVENTOR(S) : Wei-Hao Lin et al.

It is certified that error appears in the above-identified patent and that said Letters Patent is hereby corrected as shown below:

Title page, Item (57) Column 2 (Abstract), Line 13, delete "score" and insert -- score of --, therefor.

On Title page 3, Item (56) in Column 1 (Other Publications), Line 10, delete "Classifer:" and insert -- Classifier: --, therefor.

On Title page 3, Item (56) in Column 1 (Other Publications), Line 15, delete "a.," and insert -- al., --, therefor.

On Title page 3, Item (56) in Column 1 (Other Publications), Line 39, delete "Vergal" and insert -- Verlag --, therefor; delete "Heidelbreg;" and insert -- Heidelberg; --, therefor.

On Title page 3, Item (56) in Column 1 (Other Publications), Line 40, delete "Volum" and insert -- Volume --, therefor.

On Title page 3, Item (56) in Column 1 (Other Publications), Line 45, delete "Vergal" and insert -- Verlag --, therefor.

On Title page 3, Item (56) in Column 1 (Other Publications), Line 48, delete "Simpulation:" and insert -- Simulation: --, therefor.

On Title page 3, Item (56) in Column 2 (Other Publications), Line 26, delete "Techonological" and insert -- Technological --, therefor.

In the Claims

In Claim 1, Column 29, Line 46, delete "some" and insert -- some of --, therefor.

In Claim 7, Column 31, Line 10, delete "a" and insert -- the --, therefor.

In Claim 13, Column 32, Line 14, delete "some" and insert -- some of --, therefor.

Signed and Sealed this
Fourth Day of February, 2014

Michelle K. Lee
*Deputy Director of the United States Patent and Trademark Office*